(12) United States Patent
Shirato et al.

(10) Patent No.: US 6,823,241 B2
(45) Date of Patent: Nov. 23, 2004

(54) LANE RECOGNITION APPARATUS FOR VEHICLE

(75) Inventors: Ryota Shirato, Yokohama (JP); Hiroshi Mouri, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/951,499

(22) Filed: Sep. 14, 2001

(65) Prior Publication Data

US 2002/0042668 A1 Apr. 11, 2002

(30) Foreign Application Priority Data

Oct. 2, 2000 (JP) ........................................ 2000-302709

(51) Int. Cl.[7] ............................ G06G 7/78; G06F 17/00
(52) U.S. Cl. ........................................................ 701/1
(58) Field of Search ................................ 701/1, 23, 30, 701/25–28, 93, 98, 117–119, 122, 205, 300–301; 382/104, 162, 165, 173, 175, 181, 190, 199, 201, 203, 276, 287; 340/435–437; 342/70–71, 454–458; 180/167–169

(56) References Cited

U.S. PATENT DOCUMENTS

| | | | | |
|---|---|---|---|---|
| 4,828,061 A | * | 5/1989 | Kimbrough et al. | ......... 180/413 |
| 5,890,083 A | | 3/1999 | Franke et al. | ................. 701/45 |
| 6,092,018 A | * | 7/2000 | Puskorius et al. | ..... 123/339.11 |
| 6,292,752 B1 | * | 9/2001 | Franke et al. | ............... 340/435 |

FOREIGN PATENT DOCUMENTS

| | | | |
|---|---|---|---|
| EP | 0 527 665 A1 | 2/1993 | |
| EP | 0 586 857 A1 | 3/1994 | |
| EP | 0 810 569 A1 | 12/1997 | |
| EP | 0 827 127 A1 | 3/1998 | |
| EP | 0 896 918 A2 | 2/1999 | |
| JP | 8-5388 | 1/1996 | |
| JP | 11-23291 | 1/1999 | |
| JP | 11-023291 | * 1/1999 | ........... G01C/21/00 |
| JP | 11-70884 | 3/1999 | |
| JP | 11-259639 | 9/1999 | |

OTHER PUBLICATIONS

S. Murata et al., "Onboard locating system using real–time image processing for a self–navigating vehicle," *IEEE Transactions on Industrial Electronics*, vol. 40, No. 1, pp. 145–153, Feb. 1993.

S. Gil et al., "Feature selection for object tracking in traffic scenes," *SPIE*, vol. 2344, pp. 253–266, 1994.

Mouri et al., "Investigation on Automatic Path Tracking Using Extended Kalman Filter", Society of Automotive Engineers of Japan (Oct. 19, 2000); pp. 1–4.

* cited by examiner

*Primary Examiner*—Thu V. Nguyen
(74) *Attorney, Agent, or Firm*—Foley & Lardner LLP

(57) ABSTRACT

A lane recognition apparatus for a vehicle is comprised of an image picking-up section which picks up a road image in front of the vehicle, a lane-marker candidate-point detecting section which detects coordinate values of a plurality of lane marker candidate points from the road image, and a road model parameter calculating section which estimates a road model parameter representative of a road shape in front of the vehicle and a vehicle state quantity of the vehicle using an extended Kalman filter, on the basis of the coordinate values of the lane marker candidate points.

4 Claims, 19 Drawing Sheets

IN INCLEMENT WEATHER

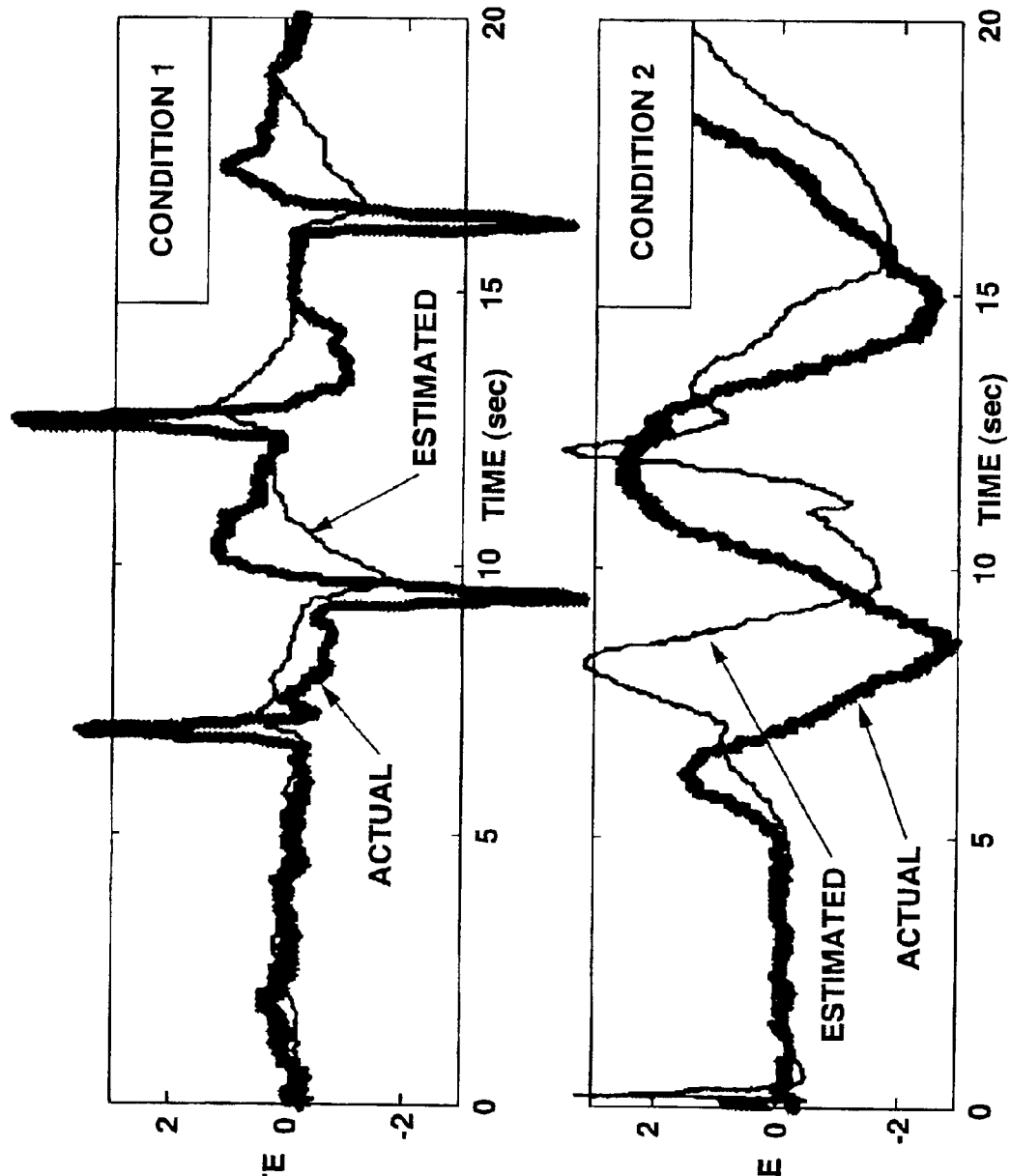

LANE RECOGNITION APPARATUS FOR VEHICLE

BACKGROUND OF THE INVENTION

The present invention relates to an apparatus for recognizing a lane on which a vehicle or other mover travels.

Various lane recognition apparatuses have been proposed in order to assist a driver to drive a vehicle along a lane or to automatically drive a vehicle. Japanese Patent Provisional Publication No. 8-5388 discloses a method for estimating a road shape using a least square method.

SUMMARY OF THE INVENTION

However, such a conventional method yet includes several problems to be improved in order to further accurately and stably estimate a road shape.

It is therefore an object of the present invention to provide an improved lane recognition apparatus which is capable of accurately estimating a road shape (a lane) while stably performing the estimation against disturbances.

An aspect of the present invention resides in a lane recognition apparatus which is for a vehicle and which comprises an image picking-up section, a lane-marker candidate-point detecting section and a road model parameter calculating section. The image picking-up section picks up a road image in front of the vehicle. The lane-marker candidate-point detecting section detects coordinate values of a plurality of lane marker candidate points from the road image. The road model parameter calculating section estimates a road model parameter representative of a road shape in front of the vehicle and a vehicle state quantity of the vehicle using an extended Kalman filter, on the basis of the coordinate values of the lane marker candidate points.

Another aspect of the present invention resides in a lane recognition apparatus which is for a vehicle and comprises a camera and a processor. The camera picks up a road image in front of the vehicle. The processor is coupled to the camera and is arranged to calculate coordinate values of a plurality of lane marker candidate points from the road image, to estimate a road model parameter representative of a road shape in front of the vehicle and a vehicle state quantity from an extended Kalman filter and the coordinate values of the lane marker candidate points.

A further another aspect of the present invention resides in a method for recognizing a lane in front of a vehicle. The method comprises a step for picking up a road image in front of the vehicle, a step for calculating coordinate values of a plurality of candidate points of a lane marker from the road image, and a step for estimating a road model parameter representative of a road shape in front of the vehicle and a vehicle state quantity from an extended Kalman filter and the coordinate values of the lane marker candidate points.

The other objects and features of this invention will become understood from the following description with reference to the accompanying drawings.

BRIEF DESCRIPTION OF THE DRAWINGS

FIGS. 14A and 14B are time charts showing the lane marker candidate point influenced by the steering angle.

DETAILED DESCRIPTION OF THE INVENTION

Embodiments of the invention will now be described based on the drawings.

[First Embodiment]

Figure 1:
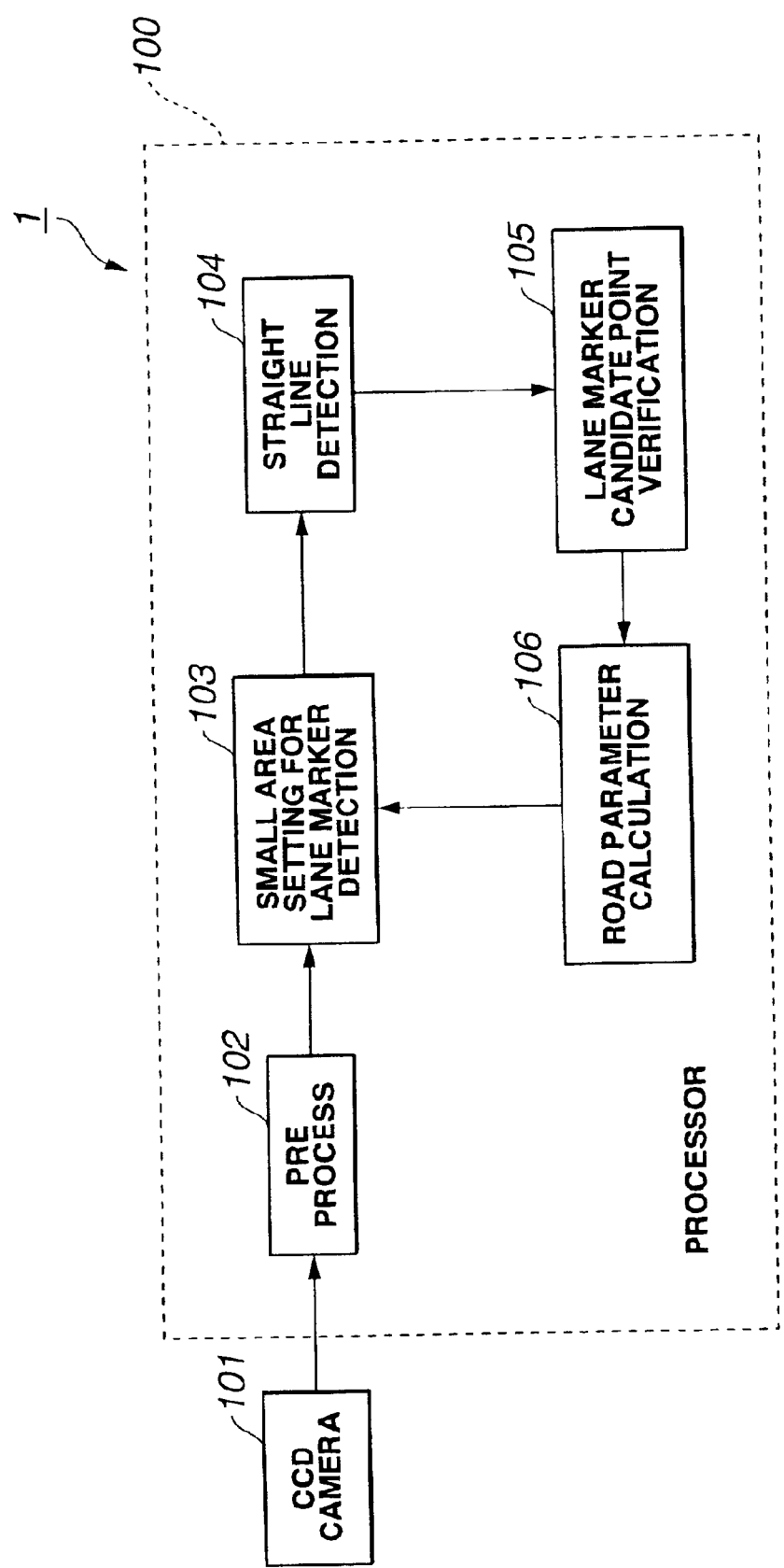
FIG. 1 is a block diagram showing a first embodiment of a lane recognition apparatus for a vehicle according to the present invention.

FIG. 1 is a block diagram showing an embodiment of a lane recognition apparatus 1 for a vehicle according to the invention. Lane recognition apparatus 1 for a vehicle according to the present embodiment comprises a CCD camera 101 for picking up an image of a scene of a road in front of the vehicle (which corresponds to the image pickup section of the invention) a pre-process section 102 for uniformly processing an entire screen of a video signal from CCD camera 101, a lane marker detecting small area setting section 103 for setting a plurality of small areas for detecting a lane marker on an input screen, a straight line detecting section 104 for detecting parts of the lane marker in the plurality of small areas, a lane marker candidate point verifying section 105 for verifying that results of straight line detection are parts of the lane marker, and a road parameter calculating section 106 for calculating road parameters for representing the shape of the road in front of the vehicle based on the result of lane marker detection.

The lane recognition apparatus 1 comprises a processor 100 which is constituted by a microcomputer and which is coupled to CCD camera 101. The microcomputer is arranged to store the sections 101 through 106 of the lane recognition apparatus in the form of software and to perform the processes of the sections 101 through 106 by executing a program control in processor 100.

Now, there will be described steps for recognizing a lane executed by lane recognition apparatus 1 according to the present invention.

Figure 2:
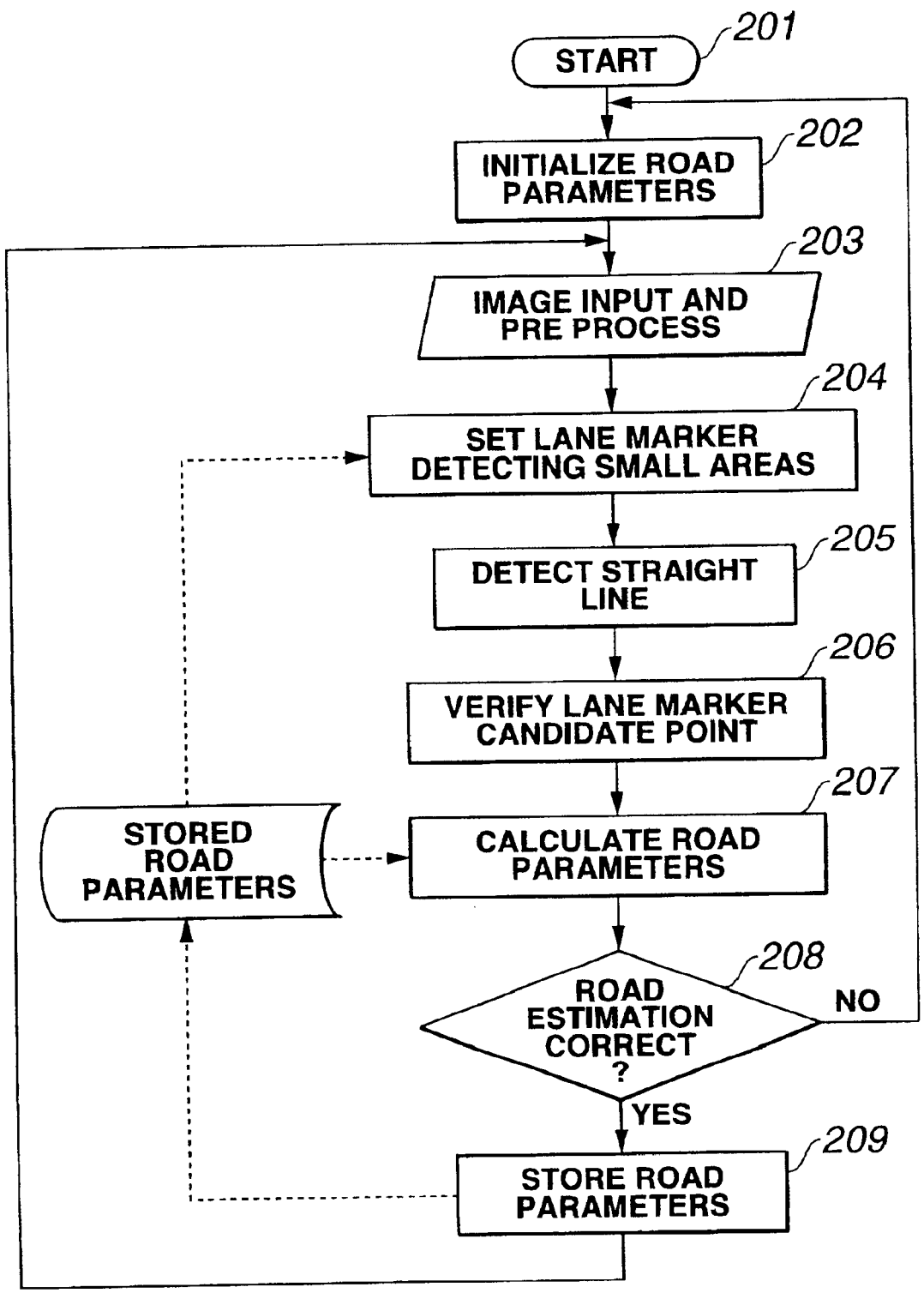
FIG. 2 is a flowchart showing an information processing procedure of the lane recognition apparatus of FIG. 1.

FIG. 2 is a flow chart showing a flow of processes in the first embodiment according to the present invention. First, lane recognition apparatus 1 is started when a switch is operated by the driver or the vehicle is ignited at step 201, and, road parameters for recognizing the shape of a road in front of the vehicle are initialized at step 202.

Figure 3B:
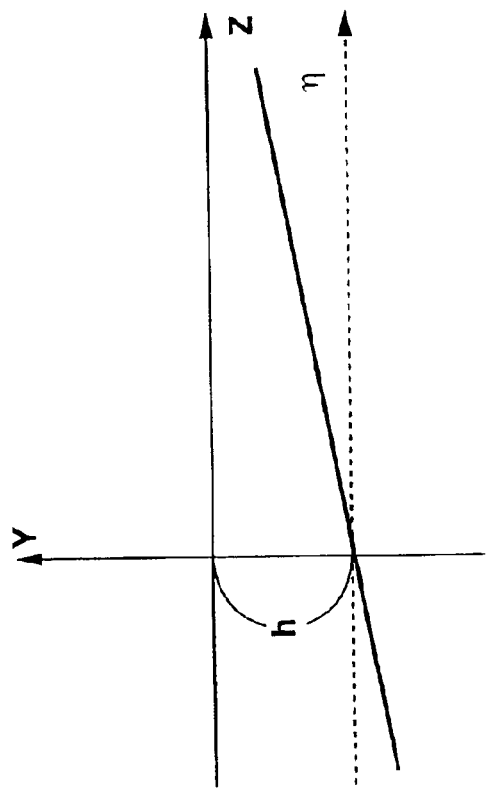
FIGS. 3A and 3B are a plan view and a side view which show a road model employed in the first embodiment.
Figure 3A:
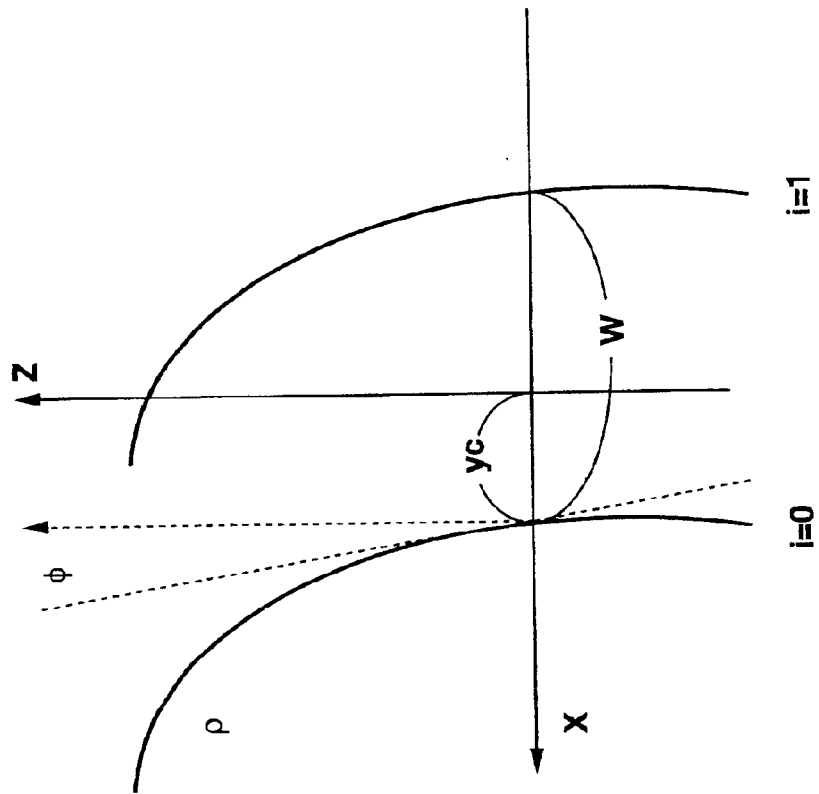
Figure 4:
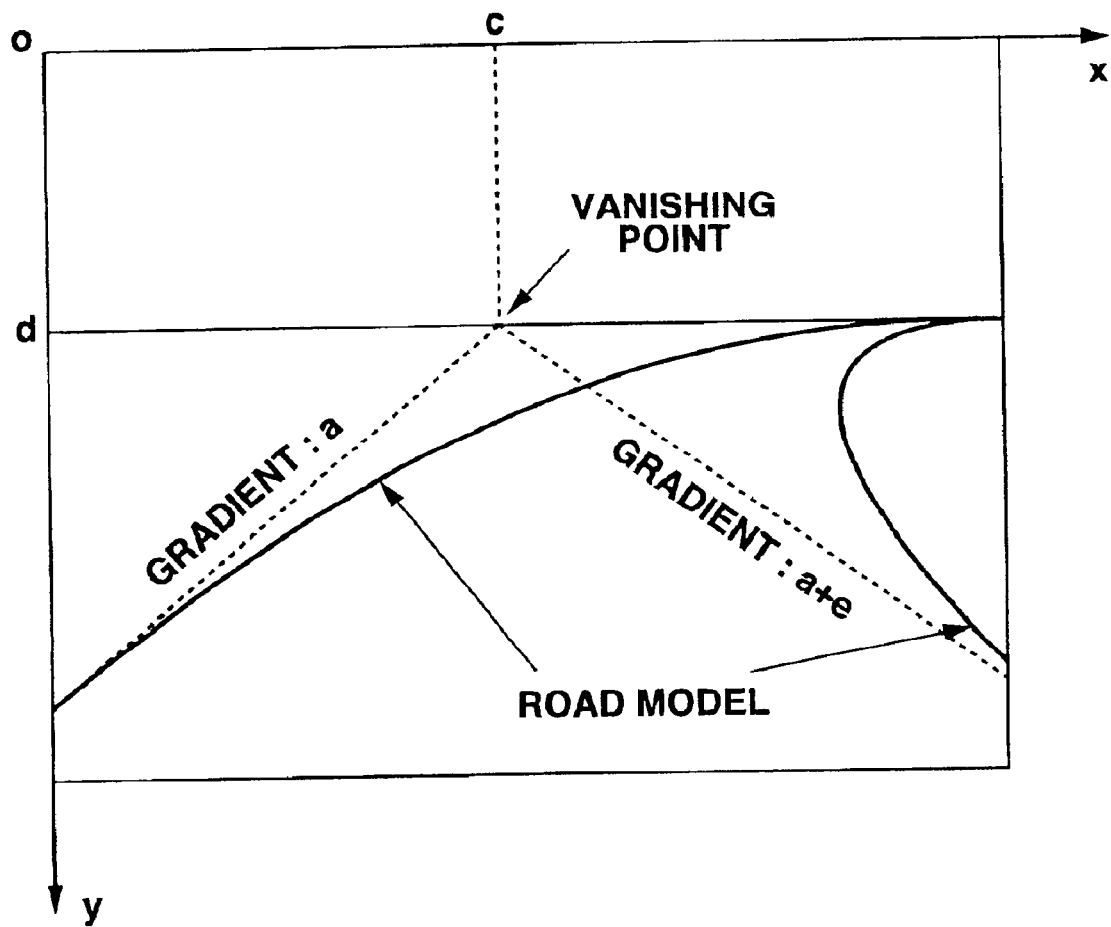
FIG. 4 is a view showing the image picture on which the road model is developed.

The road parameters are defined according to the following procedure. As shown in FIGS. 3A and 3B, a road coordinate system is defined as an XYZ system in which the center of an image pickup lens of CCD camera 101 is the origin. The X-axis extends from the right to the left as viewed in the traveling direction of the vehicle. The Y-axis extends upward in the direction of the height of the vehicle. The Z-axis is the optical axis of the lens in the traveling direction of the vehicle. As shown in FIG. 4, a plane coordinate system of an image processing screen is defined in which the origin is at the upper left corner of the screen. The x-axis horizontally extends from the left to the right, and the y-axis vertically extends from the top to the bottom. These definition are in accordance with the direction in which a screen is scanned in television communication systems such as NTSC.

Figure 7:
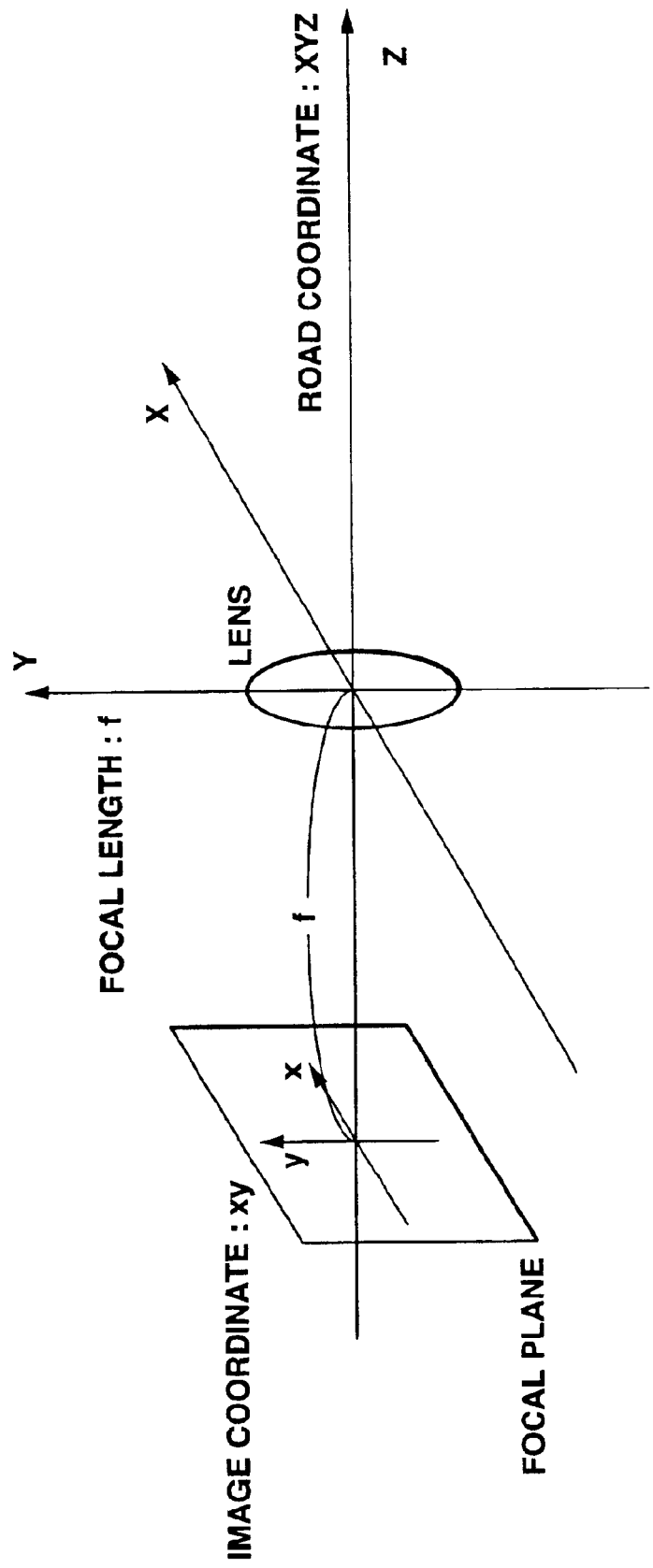
FIG. 7 is a view showing a coordinate of the road model according to the present invention.

The relationship between those two coordinate systems is as shown in FIG. 7 and, for simplicity, coordinate transformation from the road coordinate system to the plane coordinate system is expressed by Equations (1) and (2) shown below where the origin of the plane coordinate system is located on the Z-axis of the road coordinate system as shown in FIG. 7.

$$x = -fX/Z \quad (1)$$

$$y = -fY/Z \quad (2)$$

where f represents a parameter that represents the focal length of the lens.

While a planar structure of a road is defined by straight lines, curves having constant curvatures, and clothoid curves having constant curvature change rates for connecting them, a section of the road of several tens meters in front of a vehicle can be regarded as a curved road having a constant curvature or a straight road. Then, the shape of a lane marker was formulated as shown in FIG. 3A. Similarly, a longitudinal structure of the same was formulated as shown in FIG. 3B because it can be regarded as having a constant gradient. The formulae are respectively given as Equations (3) and (4) below.

$$x = \frac{\rho}{2}z^2 + \phi z + y_c - iw \quad (3)$$

$$Y = \eta Z - h \quad (4)$$

where $\rho$ represents the curvature of the road; $\phi$ represents a yaw angle of the vehicle to the road; $y_c$ represents lateral displacement of the vehicle from a left lane marker; W represents the vehicle width; i represents the left line marker when it is 0 and represents a right lane marker when it is 1; $\eta$ represents a pitch angle of the optical axis of the lens to the road surface; and h represents the height of the camera above the ground.

The shape of a lane marker projected on the plane coordinate system of the image processing screen can be formulated from Equations (1) through (4). Equations (1) through (4) can be rearranged by eliminating X, Y, and Z to obtain the following Equations (5) through (10).

$$x = (a + ie)(y - d) - \frac{b}{y - d} + c \quad (5)$$

where $$a = -y_c/h, \quad (6)$$

$$b = -f^2 h\rho/h, \quad (7)$$

$$c = -f\phi + c_0, \quad (8)$$

$$d = -f\eta + d_0, \quad (9)$$

and $$e = W/h. \quad (10)$$

The terms $c_0$ and $d_0$ are correction values that are required because the actual origin is located at the upper left corner of the image processing screen in spite of the fact that the origin of the plane coordinate system is on the Z-axis in the road coordinate system in FIG. 7.

It is apparent from the above that the curvature of the road, the pitch angle and yaw angle of the vehicle, and the lateral displacement of the vehicle within the lane can be estimated by identifying values of parameters a through e in Equation (5) which are satisfied by a lane marker candidate point detected through image processing. FIG. 4 shows association between an example of a two-dimensional road model and parameters a through e on a screen.

Returning to FIG. 2, at step 203, an image signal of an image as shown in FIG. 4 picked up by CCD camera 101 is inputted to pre-processing section 102 which performs a pre-process on the image signal. For example, as a pre-process for detecting a lane marker, primary space differentiation is performed with a Sobel Filter to emphasize a boundary between the lane marker and a road surface. The object of lane marker detection is such a boundary. Since a lane marker has regions which are nearly horizontal and regions which are nearly vertical depending on the curvature of the road, two edge images are created using horizontal differentiation and vertical differentiation. Other edge emphasizing filters may be used to emphasize a boundary between the lane marker and road surface.

Figure 6:
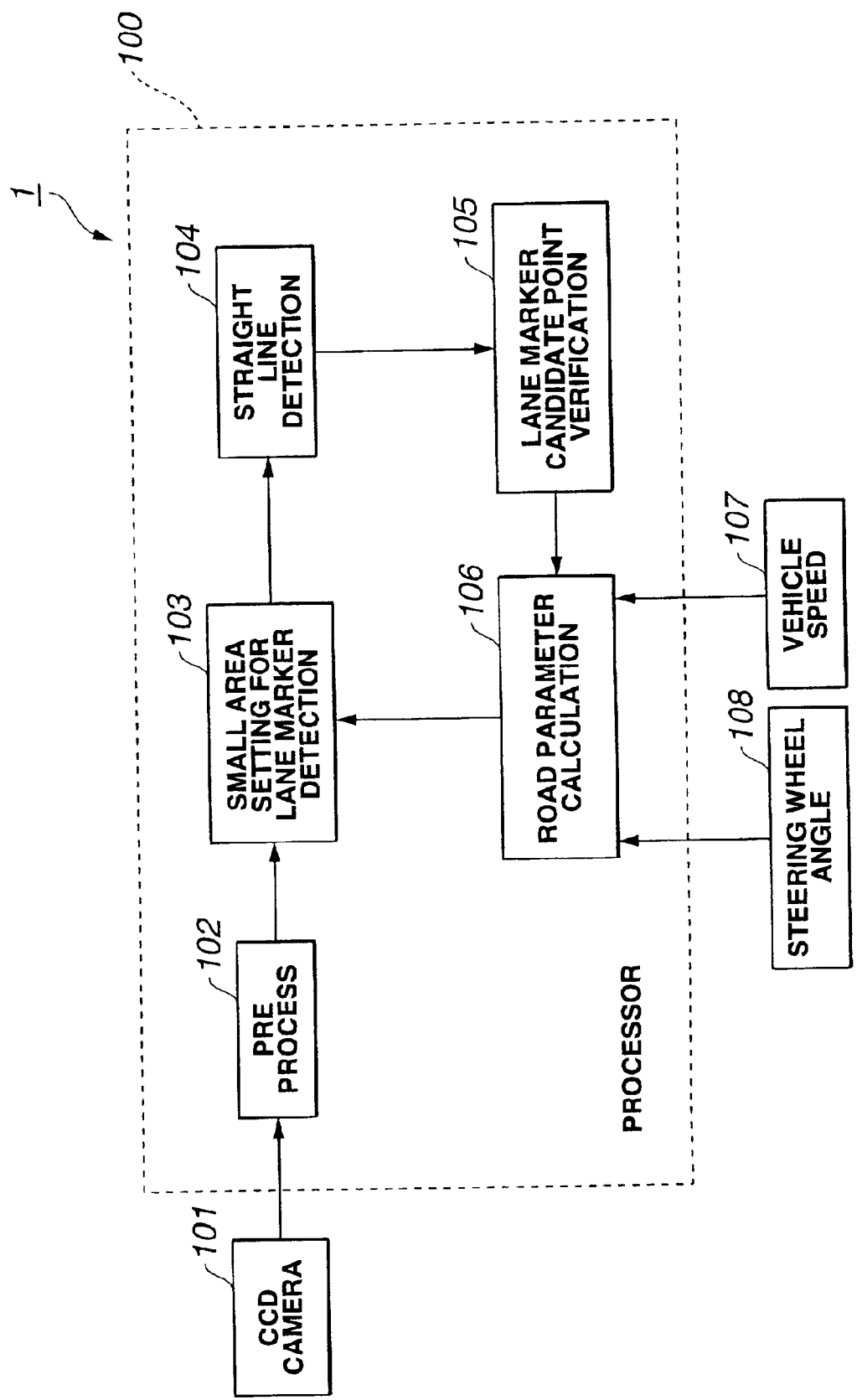
FIG. 6 is a block diagram showing a second embodiment of a lane recognition apparatus of a vehicle according to the present invention.

As shown in FIG. 6, lane recognition apparatus I for a vehicle of the second embodiment according to the present invention comprises CCD camera 101 for picking up an image of a scene of a road in front of the vehicle (which corresponds to the image pickup section of the invention), pre-process section 102 for uniformly processing an entire screen of a video signal from CCD camera 101, lane marker detecting small area setting section 103 for setting a plurality of small areas for detecting a lane marker on an input screen, straight line detecting section 104 for detecting parts of the lane marker in the plurality of small areas, lane marker candidate point verifying section 105 for verifying that results of straight line detection are parts of the lane marker, road parameter calculating section 106 for calculating road parameters for representing the shape of the road in front of the vehicle based on the result of lane marker detection, a steering angle detecting section 108 for detecting a steering angle of the vehicle and transmitting the detected steering angle to road parameter calculating section 106, and a vehicle speed detecting section 107 for detecting a traveling speed of the vehicle and transmitting the detected traveling speed to road parameter calculating section 106.

Figure 5:
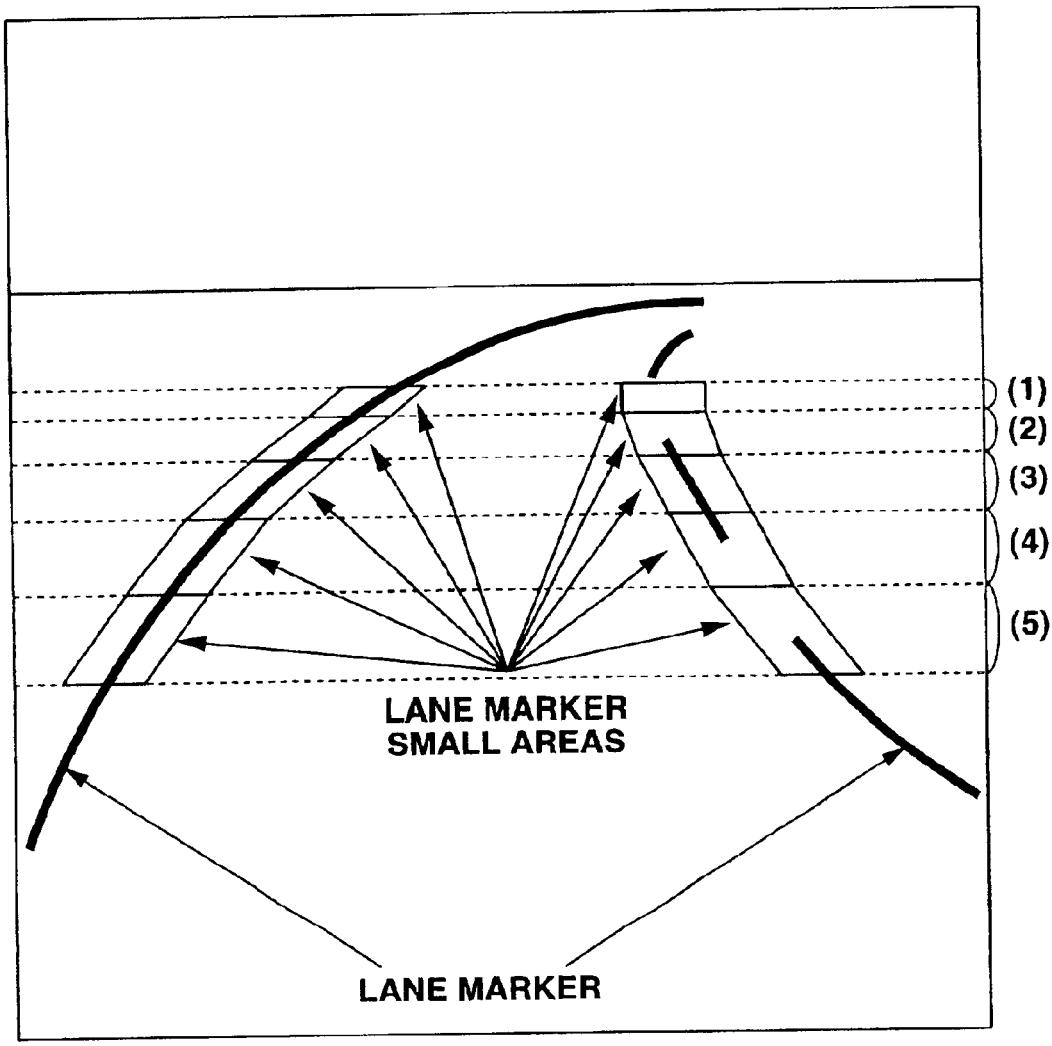
FIG. 5 is an explanatory view for explaining lane marker detecting areas adapted in the present invention.

At subsequent step 204, a plurality of small areas are set in order to detect a lane marker which indicates the lane in which the vehicle is traveling on the screen. As shown in FIG. 5, the detection areas are set as predetermined sections defined along the shape of the road identified from the results of the previous image processing or road parameters which have been initially set. At this time, sections 1 through 5 are set such that they become equal distances when the screen is transformed into an actual three-dimensional road coordinate system.

Figure 8B:
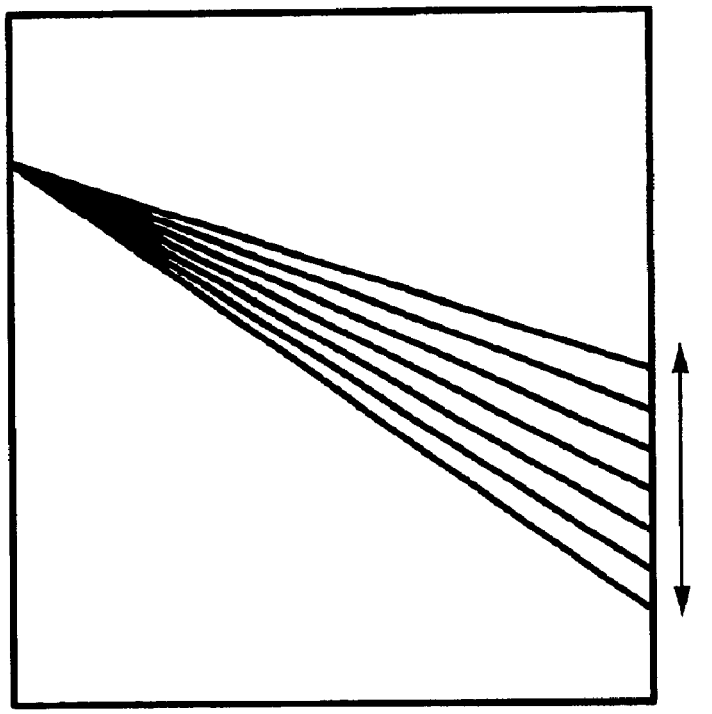
FIGS. 8A and 8B are explanatory views employed for explaining a straight line detection executed by the lane recognition process.
Figure 8A:
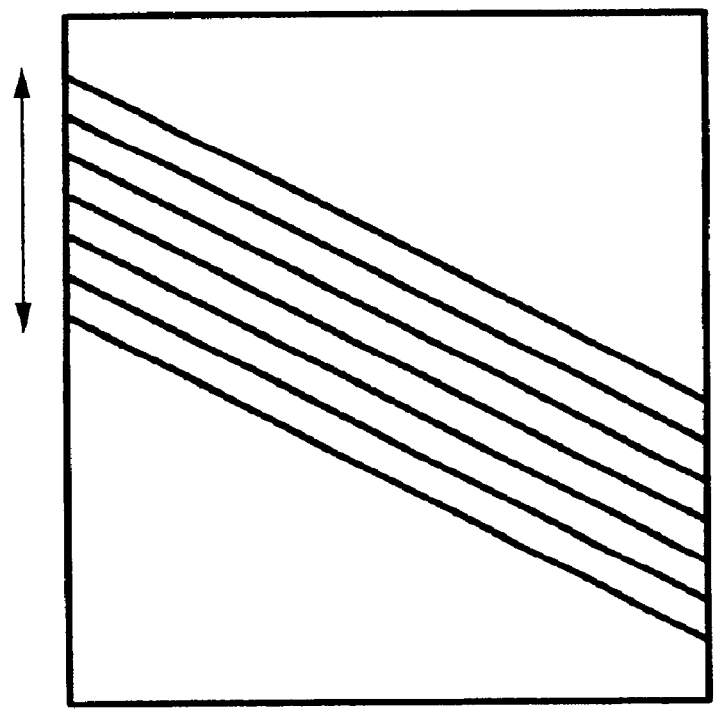
Figure 9:
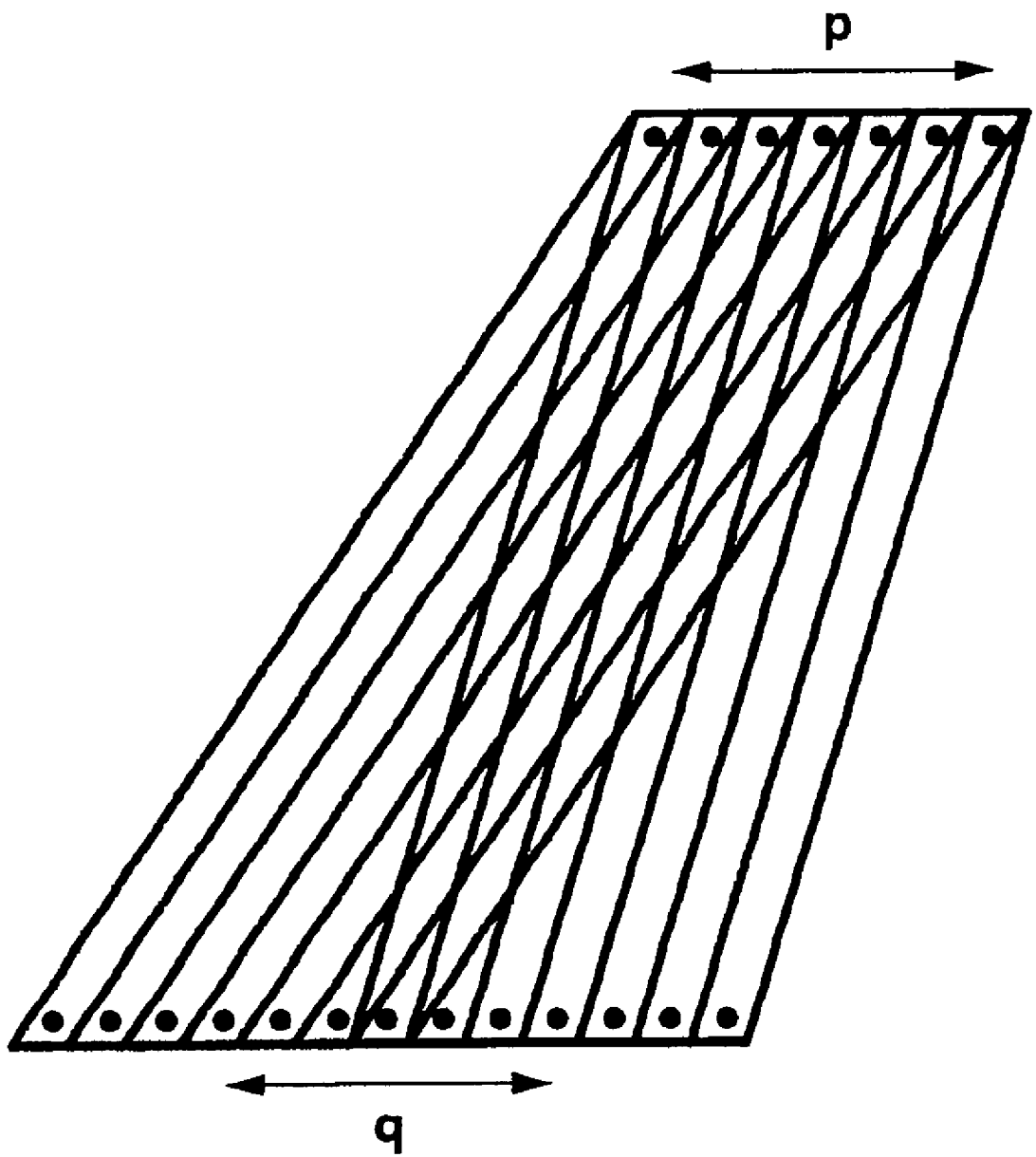
FIG. 9 is another explanatory view employed for explaining the straight line detection.

At step 205, straight lines are detected in the small regions set at step 204. Specifically, if a boundary between the lane marker in a certain small area and the road surface is identified as indicated by the black solid lines in FIG. 5 from the results of the previous image processing or initial setting, the position of the boundary at this time may undergo changes in the form of parallel movement as shown in FIG. 8A and changes of the inclination as shown in FIG. 8B. Then, those changes are combined to set a trapezoidal small area as shown in FIG. 9 as a detection area, and line segments extending across the top and bottom sides are to be detected. The size of the detection area is determined by the range p of the lateral behavior and the range q of the inclinational behavior, and pxq line segments are to be detected. The sum of edge strengths of pixels that make up each of the line segments on an edge image is calculated for each of the line segments, and the coordinates of the starting and end points of the line segment having the greatest sum are outputted as a result of the detection.

At subsequent step 206, it is verified whether the result of the detection at step 205 can support a judgment that a part of a lane marker has been detected. A road has many noises other than lane markers, including joints of pavement, shadows, and cars traveling ahead. In order to prevent erroneous detection of straight line segments originating from such noises, conditions as described below are taken into consideration when using a result of straight line detection as a candidate point of a lane marker.

Specifically, the range of changes in the position of a lane marker candidate point is first limited by the time required for processing the image, the vehicle speed, and the shape of the road. Since a lane marker is a white or yellow line, it has a pair of rows of positive and negative edge points. Further, the movement of a certain lane marker candidate point is correlated with the movement of other candidate points.

A result of straight line detection which satisfies such conditions is used as a lane marker candidate point for estimating parameters of a road model.

At subsequent step 207, parameters for the road model are calculated from the position of the lane marker candidate point on the screen obtained at step 206. In the present embodiment, an extended Kalman filter is used as means for estimating an equation for a two-dimensional road model based on a result of detection of a lane marker candidate point through image processing.

The following Equation (11) is derived from the above-described Equations (1) through (4). This equation is used as an output equation in configuring an extended Kalman filter, and the value of an x-coordinate at a y-coordinate value defined on a plane under image processing is calculated from the road curvature and a state quantity of the vehicle.

$$x = \left(-\frac{y_c}{h} + i\frac{W}{h}\right)(y + f\eta) + \frac{f^2 h\rho}{2(y + f\eta)} - f\phi \quad (11)$$

The estimated state quantity in the extended Kalman filter includes lateral displacement $y_c$ of the vehicle, road curvature $\rho$, vehicle yaw angle $\phi$, pitch angle $\eta$, and height h of CCD camera 101. Further, the focal length f of the lens and the lane width W are treated as constant values. A state equation expressed as Equation (12) shown below is obtained if it is defined as a random walk model in a discrete system which is driven by white Gaussian noises v on the assumption that a change of each estimated state quantity behaves stochastically.

$$\begin{bmatrix} y_c \\ \rho \\ \phi \\ \eta \\ h \end{bmatrix} = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix} \begin{bmatrix} y_c \\ \rho \\ \phi \\ \eta \\ h \end{bmatrix} + \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix} \begin{bmatrix} v_{y_c} \\ v_\rho \\ v_\phi \\ v_\eta \\ v_h \end{bmatrix} \quad (12)$$

When State Equation (12) and Output Equation (11) are simplified into Equations (13) and (14) shown below, the extended Kalman filter is configured by Equations (15) through (18).

$$x_s(k+1) = A_s x_s(k) + G_s v(k) \quad (13)$$

$$x = g(x_s, y) \quad (14)$$

$$\hat{x}_s(k+1|k) = A_s \hat{x}_s(k|k-1) + K(k)\{x(k) - g(\hat{x}_s(k|k-1), y(k))\} \quad (15)$$

$$K(k) = A_s P(k) C^T (CP(k)C^T + R)^{-1} \quad (16)$$

$$P(k+1) = A_s M(k) A_s^T + G_s Q G_s^T \quad (17)$$

$$M(k) = P(k)\{I - C^T (CP(k)C^T + R)^{-1} CP(k)\} \quad (18)$$

where M(k) represents covariance of states which is determined by the process; P(k) represents covariance of later states obtained from observed values; K(k) represents the gain of the Kalman filter; Q represents covariance of observation noises; R represents covariance of process noises; I represents a unit matrix; k represents a lag; and $$C \cong \frac{\partial g(\hat{x}_s(k), y(k))}{\partial x_s}.$$

While the state equation has configured as a random walk model in a discrete system in the above description, it may be represented as a first-order lag in a continuous system. A state equation in this case is given as Equation (19) shown below.

$$\begin{bmatrix} \dot{y}_c \\ \dot{\rho} \\ \dot{\phi} \\ \dot{\eta} \\ \dot{h} \end{bmatrix} = \begin{bmatrix} -\lambda_{yC} & 0 & 0 & 0 & 0 \\ 0 & -\lambda_\rho & 0 & 0 & 0 \\ 0 & 0 & -\lambda_\phi & 0 & 0 \\ 0 & 0 & 0 & -\lambda_\eta & 0 \\ 0 & 0 & 0 & 0 & -\lambda_h \end{bmatrix} \begin{bmatrix} y_c \\ \rho \\ \phi \\ \eta \\ h \end{bmatrix} + \quad (19)$$

$$\begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix} \begin{bmatrix} w_{yc} \\ w_\rho \\ w_\phi \\ w_\eta \\ w_h \end{bmatrix}$$

In Equation (19), $\lambda$ is a parameter for setting a frequency band in which disturbances can be introduced, and w represents white noises having an average value of 0. In this case, each estimated state quantity X is expressed by the following equation (20).

$$X = -\lambda_x + W_x \tag{20}$$

A power spectral density $\Phi(\omega)$ is obtained which is equivalent to a Poisson's square wave having a 0-crossing frequency of N per second and an amplitude $X_0$ where $\lambda X = 2N$ and variance of w is $2\lambda_x X_0^2$.

$$\Phi(\omega) = \frac{2\lambda X_0^2}{(\lambda^2 + \omega^2)} \tag{21}$$

Therefore, even if actual changes in the estimated state quantities are different from those in a Poisson square wave, since an average value of the changes and the behavior of the same related to variance agree with those in a Poisson square wave, $\lambda_X$ and w can be defined from actual traveling conditions. Although a Poisson square wave is used here, any other model allowing understanding of actual traveling conditions of a vehicle may be used.

Figure 16:
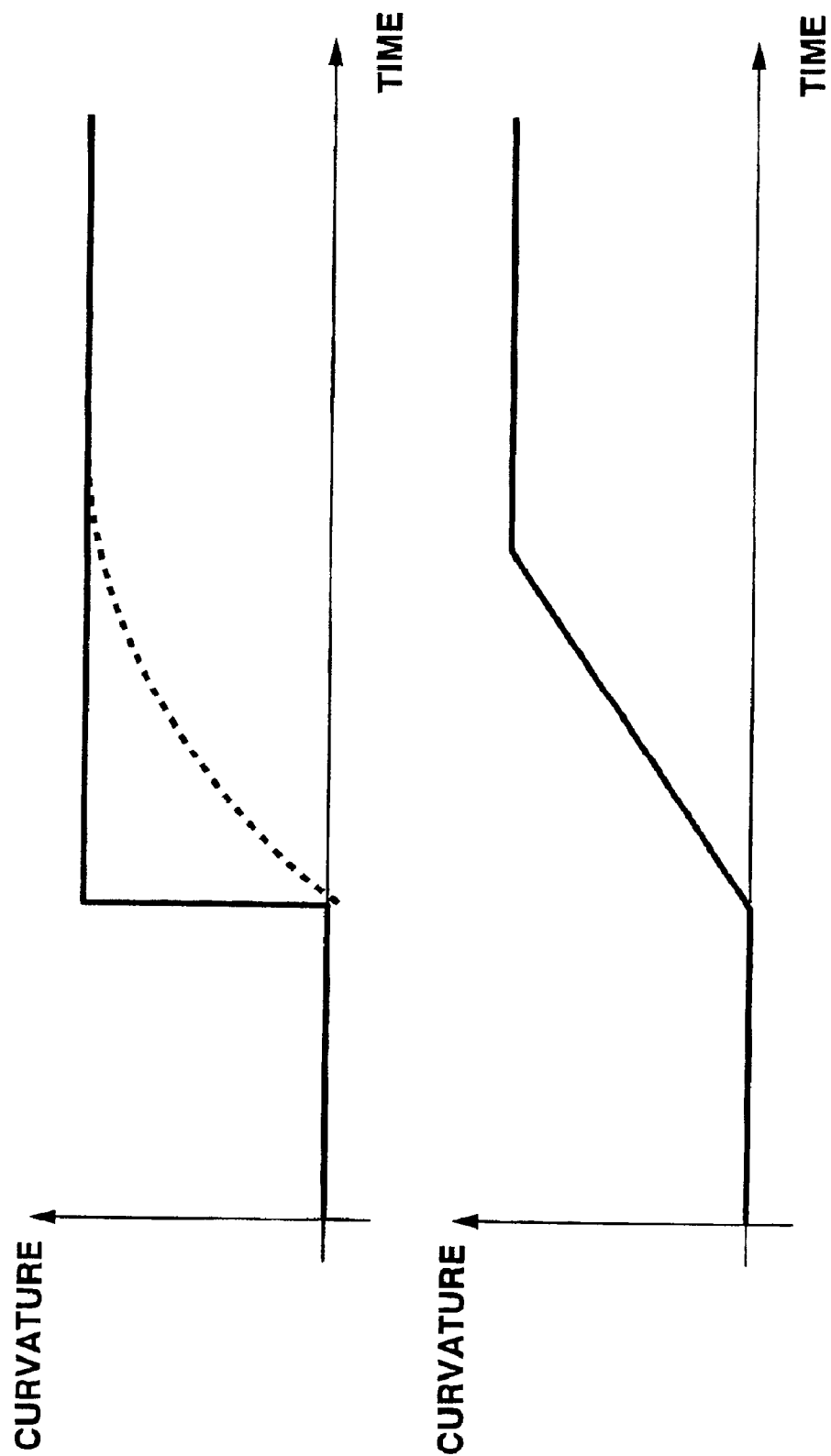
FIG. 16 is time charts employed for explaining a merit of a first-order lag of a continuous system of a state equation of the Kalman filter according to the present invention.

Since a straight line and a curve are connected by a clothoid curve in an actual road structure, an estimation result close to the actual road shape can be obtained as shown in FIG. 16 by estimating the change in the curvature with a first-order lag.

Returning to FIG. 2, it is judged at step 208 whether the road shape has been correctly estimated from road model parameters a through e obtained at step 207. Referring to parameter a for example, when the lateral position of the vehicle calculated from parameter a exceeds a predetermined range or when a change (in the speed in the lateral direction) from the result of the previous image processing exceeds a predetermined value, it is judged that the estimation of the road shape from road model parameters a through e is incorrect. This similarly applies to parameters b through e, and the estimation of the road shape from road model parameters a through e is judged to be incorrect when a physical quantity calculated from each of the parameters exceeds a predetermined range or when quantities of change of them exceed predetermined values. If the estimation of the road shape is judged to be correct, the process proceeds to subsequent step 209, and the process returns to step 202 to be re-executed from the initializing process when the estimation of the road shape is judged to be incorrect.

At step 209, the road parameters calculated at step 207 are preserved in a data storage area. Thereafter, the process returns to step 203 to acquire an image to perform processing of the next screen.

The processes in the present embodiment are performed according to the above procedure.

While changes in the parameters have been described as being driven by independent white Gaussian noises in the first embodiment, since such changes have some correlation with changes in the yaw angle and the lateral position, changes in the pitch angle and the camera height, and changes in the curvature and yaw angle, a state equation may be configured in consideration to those factors.

[Second Embodiment]

Figure 10A:
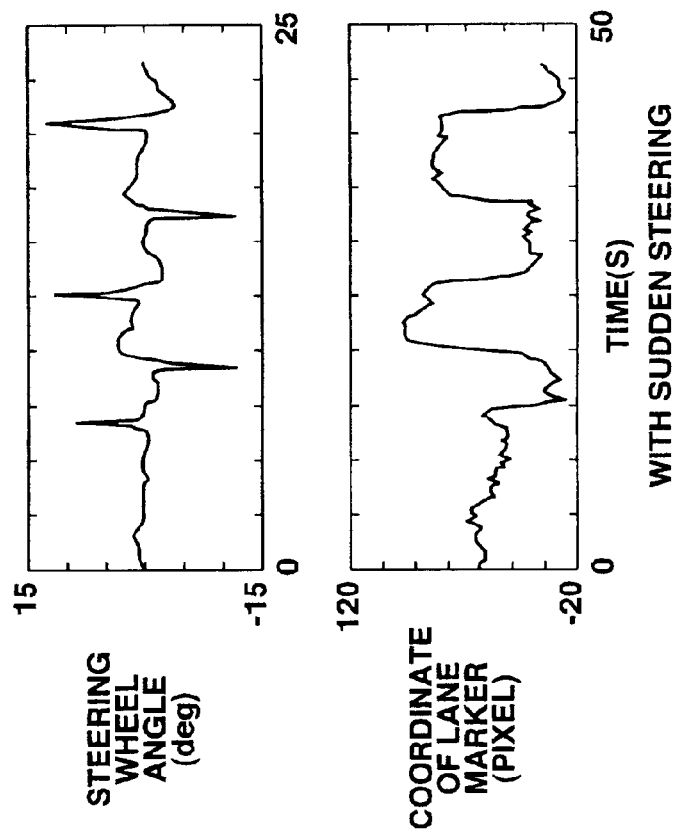
FIGS. 10A and 10B are time charts showing the lane marker candidate point which is influenced by a steering angle.
Figure 10B:
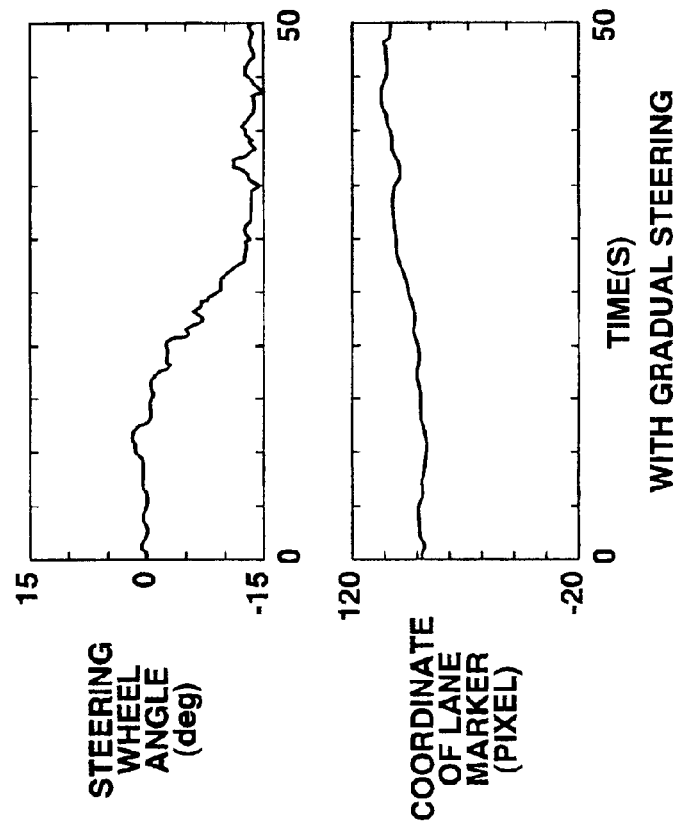
Figure 11:
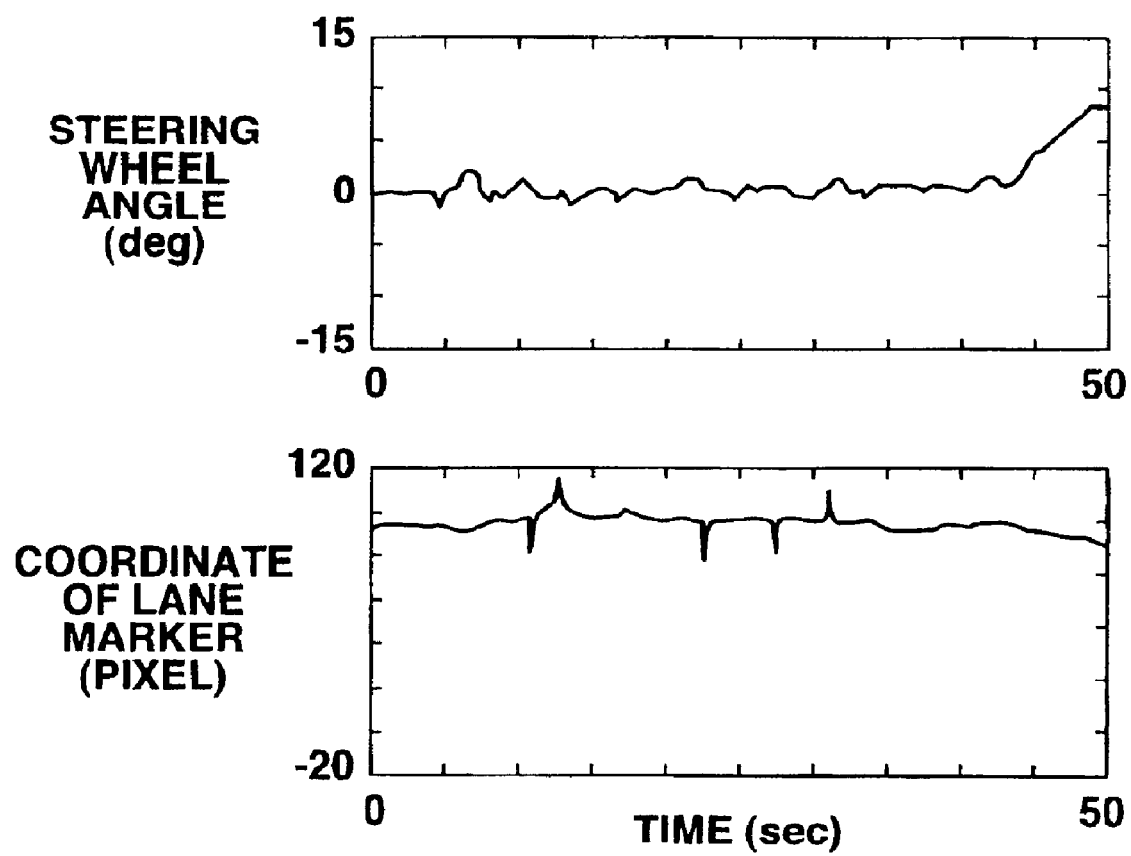
FIG. 11 is time charts showing the lane marker candidate point influenced by noises on a road surface.

FIGS. 10A and 10B show time charts (time-series changes) of a coordinate system of a lane marker candidate point projected on the surface of the CCD. When the vehicle is gradually steered along the lane as in the case of automatic driving, a lane marker candidate point moves gently as shown in FIG. 10A. On the contrary, when the steering wheel is operated suddenly as shown in FIG. 10B, a lane marker candidate point moves at a high speed which does not occur during automatic driving. Even when the steering wheel is gradually operated, erroneous recognition of a lane marker can be caused by a noise on the road surface to cause an abrupt change in the coordinate of a lane marker candidate point. FIG. 11 shows erroneous recognition of a lane marker candidate point caused by a road surface that is wetted by rain.

As described above, when a state estimator is configured based on an assumption that all movements of a lane marker candidate points are stochastic changes, erroneous recognition frequently occurs in bad weather if high dynamic characteristics of candidate points are set in the estimator, although an estimated value will follow up a true value with high performance when the steering wheel is operated. On the contrary, if low dynamic characteristics are set in the estimator, a problem arises in that an estimated value will be delayed from a true value when the steering wheel is operated.

A yaw angle or lateral displacement caused by disturbances such as a transverse gradient of a road or side wind has a low frequency band, while a yaw angle or lateral displacement caused by a steering angle has a sufficiently high frequency band. Therefore, the above-described problem can be solved by identifying whether a yaw angle or lateral displacement is caused as a result of input of a steering angle.

In the present embodiment, pitching and bouncing caused by a curvature of a road or an irregular road surface are regarded as stationary stochastic processes, and motions of a vehicle caused by the input of a steering angle are treated as deterministic states based on a vehicle model. Thus, a movement of a lane marker candidate point projected on the surface of the CCD is represented as a combination of a stochastic behavior caused by a disturbance acting on the vehicle and a deterministic behavior in accordance with a steering angle. By configuring an extended Kalman filter in such a manner, it is possible to reduce erroneous recognition of a lane marker attributable to noises on a road surface while maintaining preferable properties of following up a quick behavior of the vehicle at the input of a steering angle.

As shown in FIG. 6, lane recognition apparatus 1 for a vehicle of the second embodiment according to the present invention comprises CCD camera 101 for picking up an image of a scene of a road in front of the vehicle (which corresponds to the image pickup section of the invention), pre-process section 102 for uniformly processing an entire screen of a video signal from CCD camera 101, lane marker detecting small area setting section 103 for setting a plurality of small areas for detecting a lane marker on an input screen, straight line detecting section 104 for detecting parts of the lane marker in the plurality of small areas, lane marker candidate point verifying section 105 for verifying that results of straight line detection are parts of the lane marker, road parameter calculating section 106 for calculating road parameters for representing the shape of the road in front of the vehicle based on the result of lane marker detection, a steering angle detecting section 108 for detecting a steering angle of the vehicle and transmitting the detected steering angle to road parameter calculating section 106, and a vehicle speed detecting section 107 for detecting a traveling speed of the vehicle and transmitting the detected traveling speed to road parameter calculating section 106.

Steps for recognizing a lane will now be described.

Since some of the steps for recognizing a lane in the second embodiment are the same as those in the flow chart shown in FIG. 2, the following description will be focused on differences from the first embodiment with reference to FIG. 2.

Figure 17:
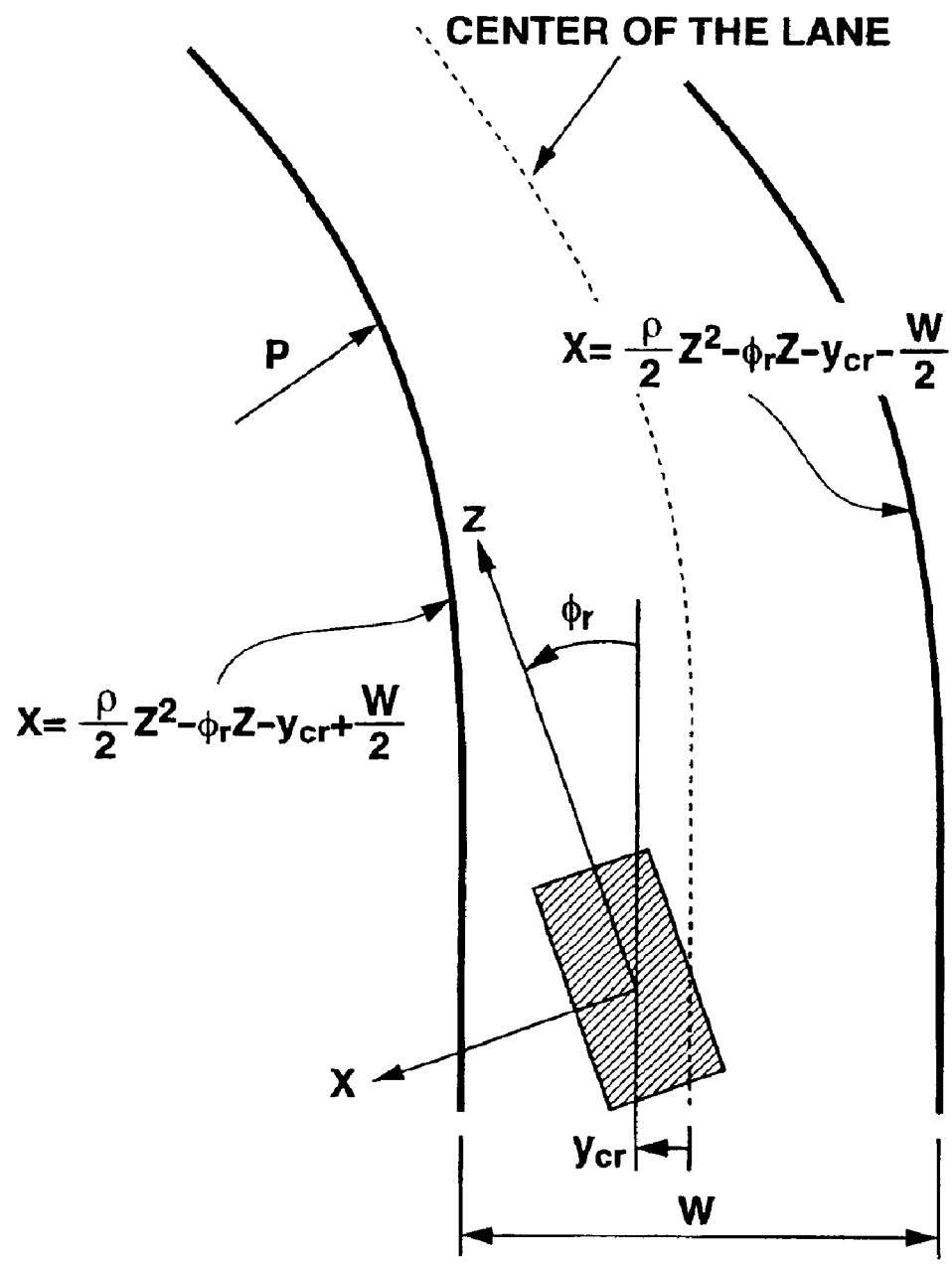
FIG. 17 is a plan view showing the road model employed in the second embodiment of the lane recognition apparatus according to the present invention.

In the second embodiment, a road model is defined as indicated by the plan view in FIG. 17. It is different from FIG. 3A in that the second embodiment shown in FIG. 17 uses lateral displacement $y_{Cr}$ of a vehicle relative to a centerline of a road unlike FIG. 3A in which lateral displacement $y_c$ of a vehicle relative to a left line marker is used as lateral displacement of the vehicle. It should be noted that $y_c = W/2 - y_{Cr}$.

While processes at steps 201 and 202 shown in FIG. 2 employed in the second embodiment are the same as those in the above described first embodiment, the shape of a lane marker shown in FIG. 17 is expressed by Equation (22) shown below from the relationship expressed by $y_c = W/2 - Y_{Cr}$. A longitudinal structure of the same is expressed by Equation (23) similarly to the above-described first embodiment.

$$X = \frac{\rho}{2} Z^2 - \phi_r Z - y_{Cr} + \frac{W}{2} - iW \qquad (22)$$

where $\rho$ represents the curvature of the road; $\phi_r$ represents a yaw angle of the vehicle to the centerline of the road; $Y_{Cr}$ represents lateral displacement of the center of gravity the vehicle from the centerline of the road; i is a lane marker number which represents a left lane marker when it is 0 and represents a right lane marker when it is 1; W represents the vehicle width; Z represents a distance in front of the vehicle from the center of the lens; X represents a distance to the left of the vehicle from the center of the lens; η represents a pitch angle of the vehicle; and h represents the height of the center of the lens above the road surface.

The shape of a lane marker projected on a plane coordinate system of an image processing screen can be formulated from Equations (1), (2), (22) and (23). Equations (1), (2), (22) and (23) can be rearranged to obtain the following Equation (24).

$$x = \left( \frac{y_{Cr} - \frac{W}{2}}{h} + i\frac{W}{h} \right)(y + f\eta) - \frac{f^2 h \rho}{2(y + f\eta)} + f\phi_r \qquad (24)$$

The present embodiment is aimed at estimating the shape of a road and a state quantity of a vehicle from a combination of (x, y) and a steering angle, and a vehicle is expressed by the following State Equation (25) based on a common two-wheeled model.

$$\ddot{\phi} = a_{11}\dot{\phi} + a_{12}\phi + a_{13}\dot{y}_c + b_{11}\theta$$

$$\ddot{y}_c = a_{31}\dot{\phi} + a_{32}\phi + a_{33}\dot{y}_c + b_{31}\theta \qquad (25)$$

Constants $a_{11}, a_{12}, a_{13}, a_{31}, a_{32}, a_{33}, b_{11}$, and $b_{31}$ in Equation (25) are constants determined by the vehicle specifications shown below.

$$a_{11} = -\frac{l_f^2 C_f + l_r^2 C_r}{VI}, \quad a_{12} = \frac{l_f C_f + l_r C_r}{I}, \quad a_{13} = -\frac{l_f C_f + l_r C_r}{VI}$$

$$a_{31} = -\frac{l_f C_f + l_r C_r}{mV}, \quad a_{32} = \frac{C_f + C_r}{m}, \quad a_{33} = -\frac{C_f + C_r}{mV}$$

$$b_{11} = \frac{l_f C_f}{IN}, \quad b_{31} = \frac{C_f}{mN}$$

where $l_f(l_r)$ represents the distance between the center of gravity and the front (or rear) wheel; $C_f(C_r)$ represents the full cornering power of the front (rear) wheels for two wheels; m represents the vehicle weight; I represents a yawing moment of inertia of the vehicle; θ represents a steering angle; N represents a steering gear ratio; V represents the vehicle speed; and φ represents a yaw rate.

The same processes as those in the above-described first embodiment are performed at steps 203 through 206.

At subsequent step 207, parameters of a road model are calculated from the position of a lane marker candidate point on a screen obtained at step 206. An extended Kalman filter is used also in the present embodiment as means for estimating an equation for a two-dimensional road model based on the result of detection of a lane marker candidate point through image processing.

A behavior of a stochastic state variable ξ for the curvature ρ, pitch angle η, the quantity of a bounce h, and various disturbances is approximated as a first-order system driven by white noises as indicated by the following Equation (26).

$$\dot{\xi} = -\lambda \xi + q \lambda \nu \qquad (26)$$

where λ is used for setting a frequency band in which disturbances can be introduced; q corresponds to a standard deviation of process noises; ν represents a normalized white Gaussian noise. A state equation of the vehicle is expressed by the following Equation (27) in which M and F represent a yaw moment and a lateral force originating from disturbances acting on the vehicle; and $[\nu_\rho \nu_\eta \nu_h \nu_M \nu_F]^T$ are put on an assumption of the presence of white Gaussian noises. $q_\rho$, $q_\eta$, $q_h$, $q_M$, and $q_F$ represent standard deviations of disturbances that drive the respective state variables. The yaw moment and lateral force of disturbances are treated as state variables here to improve lane follow-up properties by providing feedback of those state quantities and to absorb any shift of the steering wheel from a neutral position during a straight drive due to a stationary transverse gradient of a road or a side wind or any shift of the steering wheel from the neutral position at the time of shipment.

$$\begin{bmatrix} \ddot{\phi} \\ \dot{\phi}_r \\ \ddot{y}_{Cr} \\ \dot{y}_{Cr} \\ \dot{\rho} \\ \dot{\eta} \\ \dot{h} \\ \dot{M} \\ \dot{F} \end{bmatrix} = \begin{bmatrix} a_{11} & a_{12} & a_{13} & 0 & 0 & 0 & 0 & 1/I & 0 \\ 1 & 0 & 0 & 0 & -V & 0 & 0 & 0 & 0 \\ a_{31} & a_{32} & a_{33} & 0 & -V^2 & 0 & 0 & 0 & 1/m \\ 0 & 0 & 1 & 0 & 0 & 0 & 0 & 0 & 0 \\ 0 & 0 & 0 & 0 & -\lambda_\rho & 0 & 0 & 0 & 0 \\ 0 & 0 & 0 & 0 & 0 & -\lambda_\eta & 0 & 0 & 0 \\ 0 & 0 & 0 & 0 & 0 & 0 & -\lambda_h & 0 & 0 \\ 0 & 0 & 0 & 0 & 0 & 0 & 0 & -\lambda_M & 0 \\ 0 & 0 & 0 & 0 & 0 & 0 & 0 & 0 & -\lambda_F \end{bmatrix} \begin{bmatrix} \dot{\phi} \\ \phi_r \\ \dot{y}_{Cr} \\ y_{Cr} \\ \rho \\ \eta \\ h \\ M \\ F \end{bmatrix} + \qquad (27)$$

$$\begin{bmatrix} b_{11} \\ 0 \\ b_{31} \\ 0 \\ 0 \\ 0 \\ 0 \\ 0 \\ 0 \end{bmatrix} \theta + \begin{bmatrix} 0 & 0 & 0 & 0 & 0 \\ 0 & 0 & 0 & 0 & 0 \\ 0 & 0 & 0 & 0 & 0 \\ 0 & 0 & 0 & 0 & 0 \\ q_\rho \lambda_\rho & 0 & 0 & 0 & 0 \\ 0 & q_\eta \lambda_\eta & 0 & 0 & 0 \\ 0 & 0 & q_h \lambda_h & 0 & 0 \\ 0 & 0 & 0 & q_M \lambda_M & 0 \\ 0 & 0 & 0 & 0 & q_F \lambda_F \end{bmatrix} \begin{bmatrix} v_\rho \\ v_\eta \\ v_h \\ v_M \\ v_F \end{bmatrix}$$

Equation (27) is simplified into the following Equation (28) in a discrete form with the state variables maintained.

$$X_S(k+1) = A_S X_S(k) + G_S v(k)$$

$$X_S(k) = [\phi^T(k)\ \dot{\phi}_r(k)\ \dot{y}_C{}^T(k)\ y_C{}^T(k)\rho^T(k)\eta^T(k)h^T(k)M^T(k)F^T(k)]^T \quad (28)$$

A state variable vector is accompanied by a suffix "S" as represented by "$X_S$" in order to prevent it from mistaken as the x of the coordinates of the CCD surface. An output x is the x-coordinate value of a pixel of the CCD surface. The output equation is a non-linear function of the state variables as indicated by Equation (24). Specifically, (x, y) coordinate values are the coordinates of lane marker candidate points, ten points being selected in total for left and right line markers, the y-coordinate system being a fixed value. The output equation for a j-th (j ranges from 1 to 10) x-coordinate is as expressed by the following Equation (29).

$$X(j) = \left( \frac{y_{Cr} - \frac{W}{2}}{h} + i\frac{W}{h} \right)(y(j) + f\eta) - \frac{f^2 h\rho}{2(y(j) + f\eta)} + f\phi_r \quad (29)$$

Equation (29) is simplified into the following Equation (30). $g(X_s, y)$ represents a non-linear function of $X_s$ and y.

$$x = g(X_s, y) \quad (30)$$

The extended Kalman filter is expressed by the following Equations (31) through (34).

$$\hat{x}_S(k+1|k) = A_S \hat{x}_S(k|k-1) + K(k)\{x(k) - g(\hat{x}_S(k|k-1), y(k))\} \quad (31)$$

$$K(k) = A_S P(k) C^T (CP(k)C^T + R)^{-1} \quad (32)$$

$$P(k+1) = A_S M(k) A_S^T + GQG^T \quad (33)$$

$$M(k) = P(k)\{I - C^T(CP(k)C^T + R)^{-1}CP(k)\} \quad (34)$$

where M(k) represents covariance of states which is determined by the process; P(k) represents covariance of states after an observation value is obtained; and K(k) represents the gain of the Kalman filter; and $$C \cong \frac{\partial g(\hat{x}_s(k), y(k))}{\partial x_s}.$$

The parameters for the road model are obtained using the extended Kalman filter, and it is judged at subsequent step 208 whether the road shape has been correctly estimated from road model parameters a through e obtained at step 207 just as in the first embodiment described above. If the estimation of the road shape is judged to be correct, the process proceeds to subsequent step 209, and the process returns to step 202 to be re-executed from the initializing process when the estimation of the road shape is judged to be incorrect.

At step 209, the road parameters calculated at step 207 are preserved in a data storage area. Thereafter, the process returns to step 203 to acquire an image to perform processing of the next screen.

Figure 12:
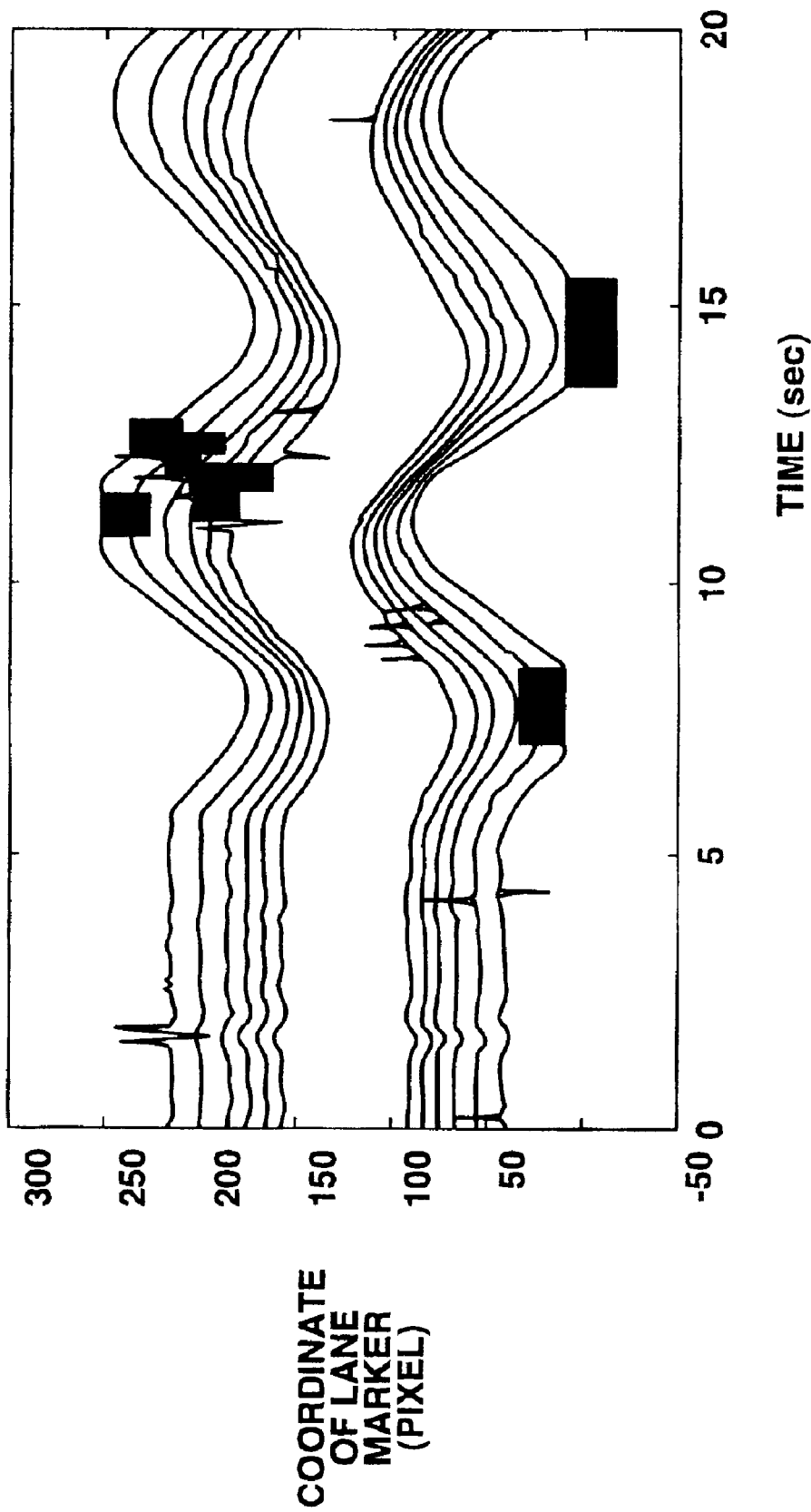
FIG. 12 is a time chart showing the lane marker candidate point influenced by noises on a road surface.

Evaluation and comparison of performance was conducted between an extended Kalman filter utilizing a cause-effect relationship between state quantities of a vehicle caused by a steering angle and an extended Kalman filter for which no steering angle information was considered, with reference to a yaw rate which was actually measured with a gyroscope loaded on the vehicle. Referring to conditions for the evaluation, they were evaluated under two conditions, i.e., (1) a steering angle was abruptly inputted, and (2) erroneous recognition of a lane marker was caused by noises on a road surface. Since a lane marker candidate point is detected through edge processing as a basic process, contrast caused by noises such as rain on the road is erroneously recognized under the condition (2). This results in a discontinuous behavior as shown in FIG. 12.

Figures 13A, 13B:
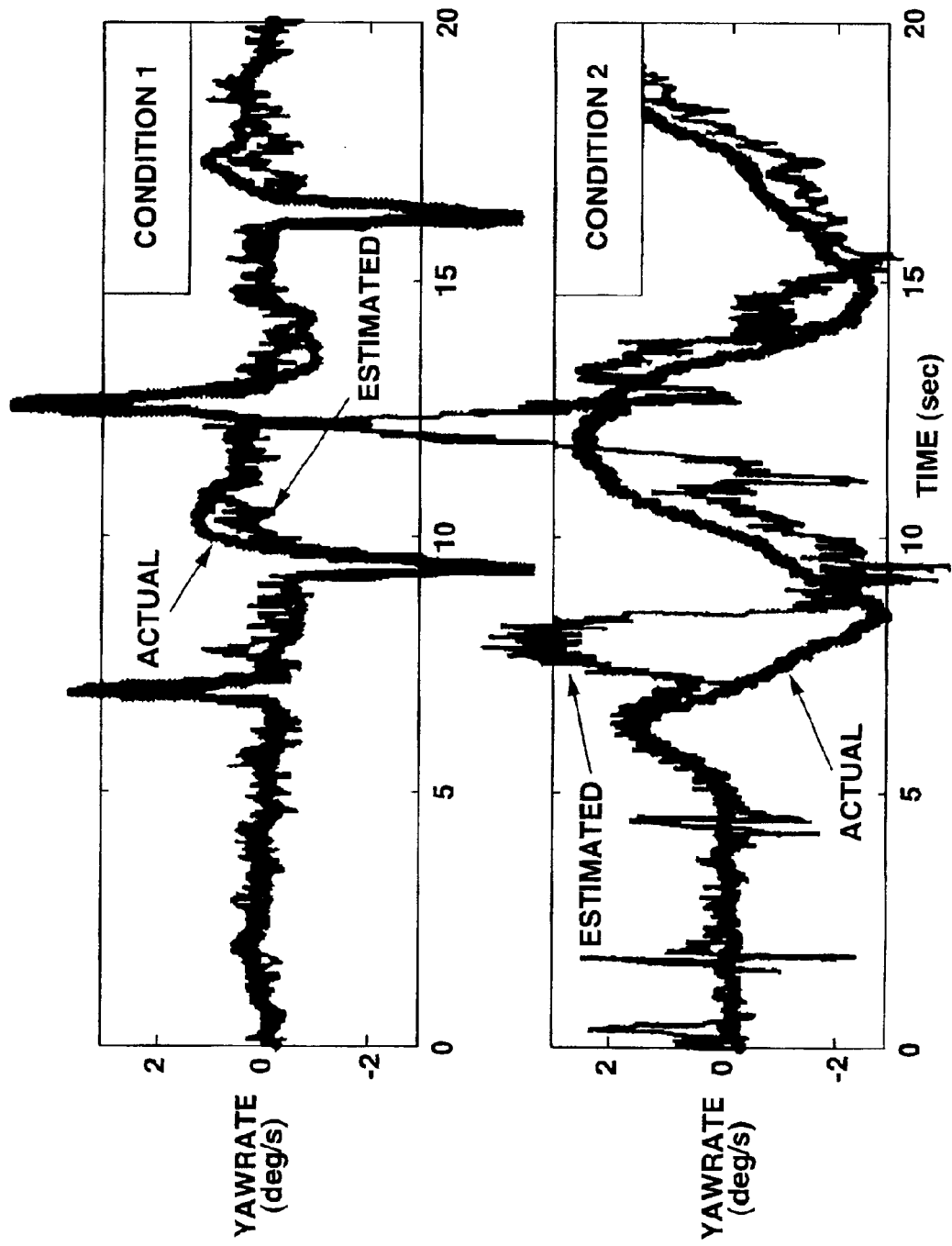
FIGS. 13A and 13B are time charts showing the lane marker candidate point influenced by the steering angle.

First, FIGS. 13A and 13B show results of estimation by the extended Kalman filter for which no steering angle information was considered and in which high dynamic characteristics were set. FIG. 13A shows a result of estimation under the condition (1), and FIG. 13B shows a result of estimation under the condition (2). As shown in FIG. 13A, the estimated value follows up the true value with high response when a steering angle is quickly inputted per the condition (1) described above. However, as apparent from FIG. 13B, estimation errors having great amplitudes occur in this state when there are many noises on the road surface as experienced under the condition (2).

FIGS. 14A and 14B show results of estimation by the extended Kalman filter for which no steering angle information was considered and in which low dynamic characteristics were set. FIG. 14A shows a result of estimation under the condition (1), and FIG. 14B shows a result of estimation under the condition (2). In this case, while estimation errors at the time of erroneous recognition have amplitudes smaller than those in the example shown in FIGS. 13A and 13B, it is apparent that the dynamic characteristics of the estimator are too low to obtain correct estimation values.

Thus, the extended Kalman filter for which no steering angle information is considered has tradeoff between the property of following up a true value (speed of estimation) and estimation errors at the time of erroneous recognition (anti-noise performance).

Figures 15A, 15B:
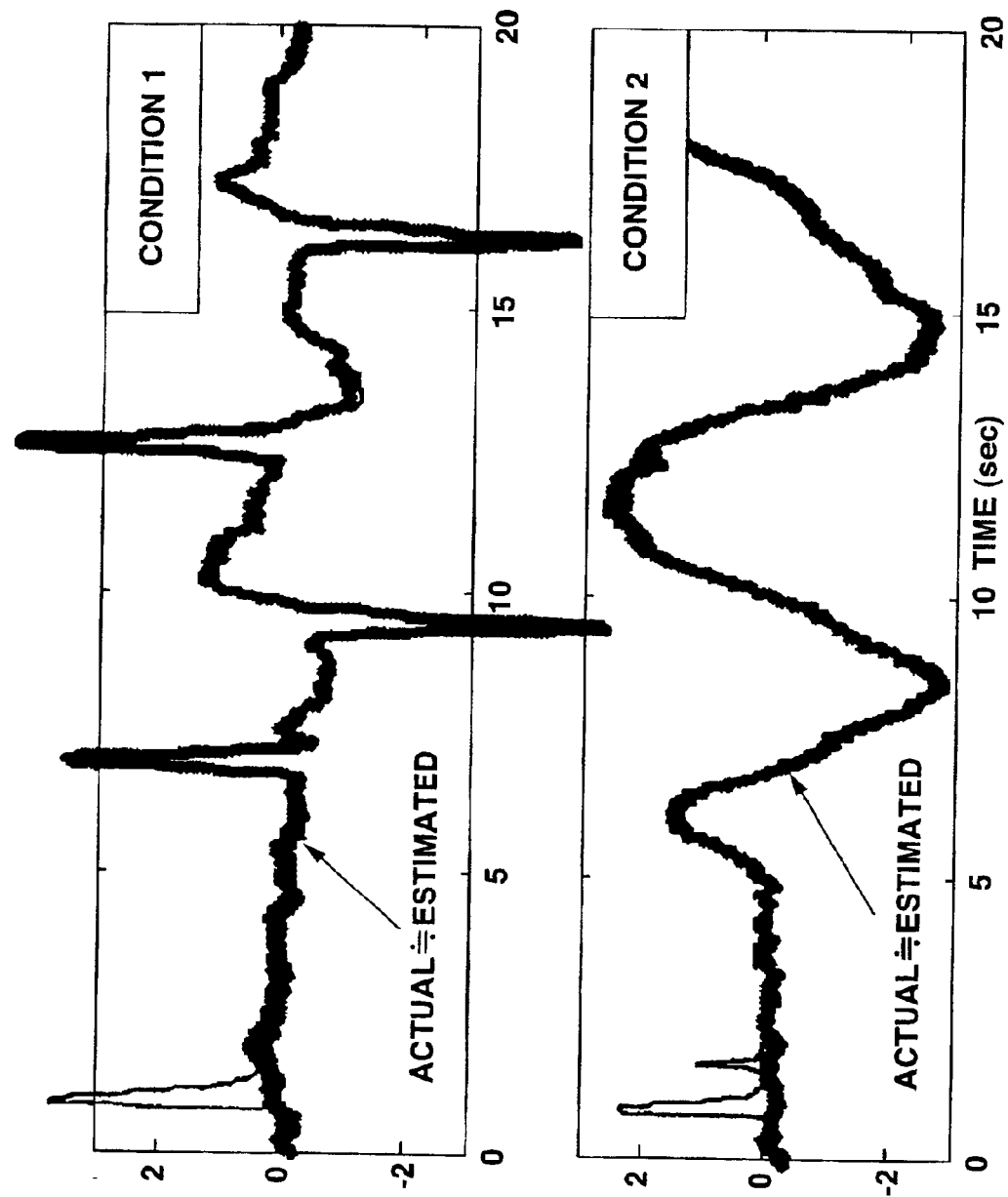
FIGS. 15A and 15B are time charts showing the lane marker candidate point influenced by the steering angle.

On the contrary, FIGS. 15A and 15B show results of estimation according to the present invention. The results of the estimation were obtained using the extended Kalman filter for which steering angle information was considered. FIG. 15A shows a result of estimation under the condition (1), and FIG. 15B shows a result of estimation under the condition (2). The dynamic characteristics of the extended Kalman filter of this example were kept constant regardless of the conditions. The results show that the extended Kalman filter for which steering angle information is considered can overcome the tradeoff that is a problem in the extended Kalman filters shown in FIGS. 13A, 13B, 14A and 14B because the vehicle behavior caused by a steering angle is modeled.

In general, conventional lane tracking systems are constituted by an image processing system for estimating lateral displacement of a point for forward observation by detecting a lane marker and a steering control system operating based on information from the image processing system. However, a control system utilizing estimated values of intermediate variables such as lateral displacement of a point for forward observation is useless for optimal control of a steering system. It is more rational and efficient to estimate and use state variables of a vehicle required for optical steering control system directly with an image processing system. That is, in the present embodiment, state quantities of a vehicle are directly estimated from coordinate values on the image pickup surface of a CCD to perform optimal control.

$H_2$ control can be easily configured by extending the above-described Equation (27) as it is into a generalized plant. However, since the output equation is non-linear as apparent from Equation (24), the extended Kalman filter represented by Equations (31) through (34) is used for estimating state quantities, and a feedback gain obtained to allow observation of all states is used for a regulator (state feedback section). This makes it possible to minimize $H_2$ norm from disturbance w to control quantity z on an approximated basis while it is a non-linear system.

$$\dot{x} = Ax + B_1 w + B_2 u$$

$$z = C_1 x + D_{11} w + D_{12} u$$

$$x = [\dot{\phi}\ \phi\ \dot{y}_{Cr}\ y_{Cr}]^T,\ z = [Z_1 \theta]^T,\ W = [\rho\ M\ F]^T,\ u = \theta$$

$$A = \begin{bmatrix} a_{11} & a_{12} & a_{13} & 0 \\ 1 & 0 & 0 & 0 \\ a_{31} & a_{32} & a_{33} & 0 \\ 0 & 0 & 1 & 0 \end{bmatrix},\ B_1 = \begin{bmatrix} 0 & 1/I & 0 \\ -V & 0 & 0 \\ -V^2 & 0 & 1/m \\ 0 & 0 & 0 \end{bmatrix}, \quad (35)$$

$$B_2 = \begin{bmatrix} b_{11} \\ 0 \\ b_{31} \\ 0 \end{bmatrix}\ C_1 = \begin{bmatrix} 0 & 0 & 0 & Q^{1/2} \\ 0 & 0 & 0 & 0 \end{bmatrix}, D_{12} = \begin{bmatrix} 0 \\ 1 \end{bmatrix},\ D_{11} = 0_{2 \times 3}$$

In Equations (35), a generalized plant equivalent to an optimal regulator is configured, and Q is a weight for lateral displacement. Frequency shaping may be adopted instead of such a scalar weight. The feedback gain is given by $K = -B_2^T H$ where H is a positive definite solution to Riccati's Equation (36).

$$A^T H + HA - H B_2 B_2^T H^T + C_1^T C_1 = 0 \qquad (36)$$

Figure 18:
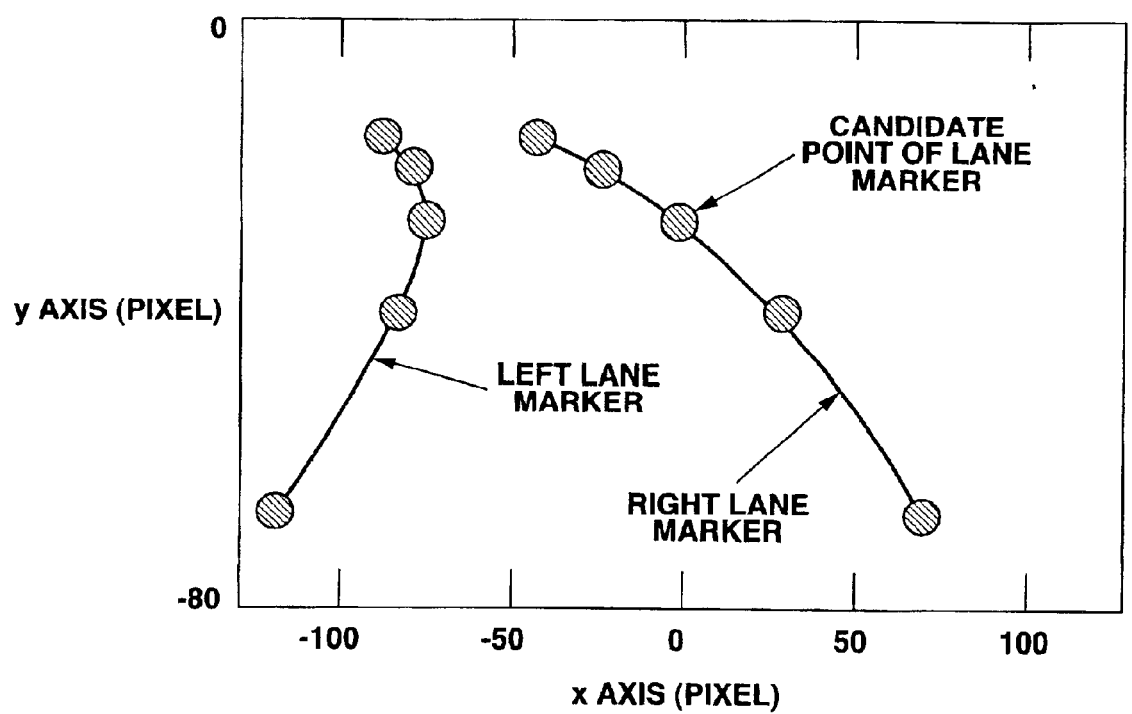
FIG. 18 is a view showing a simulation result of the second embodiment according to the present invention.
Figure 19:
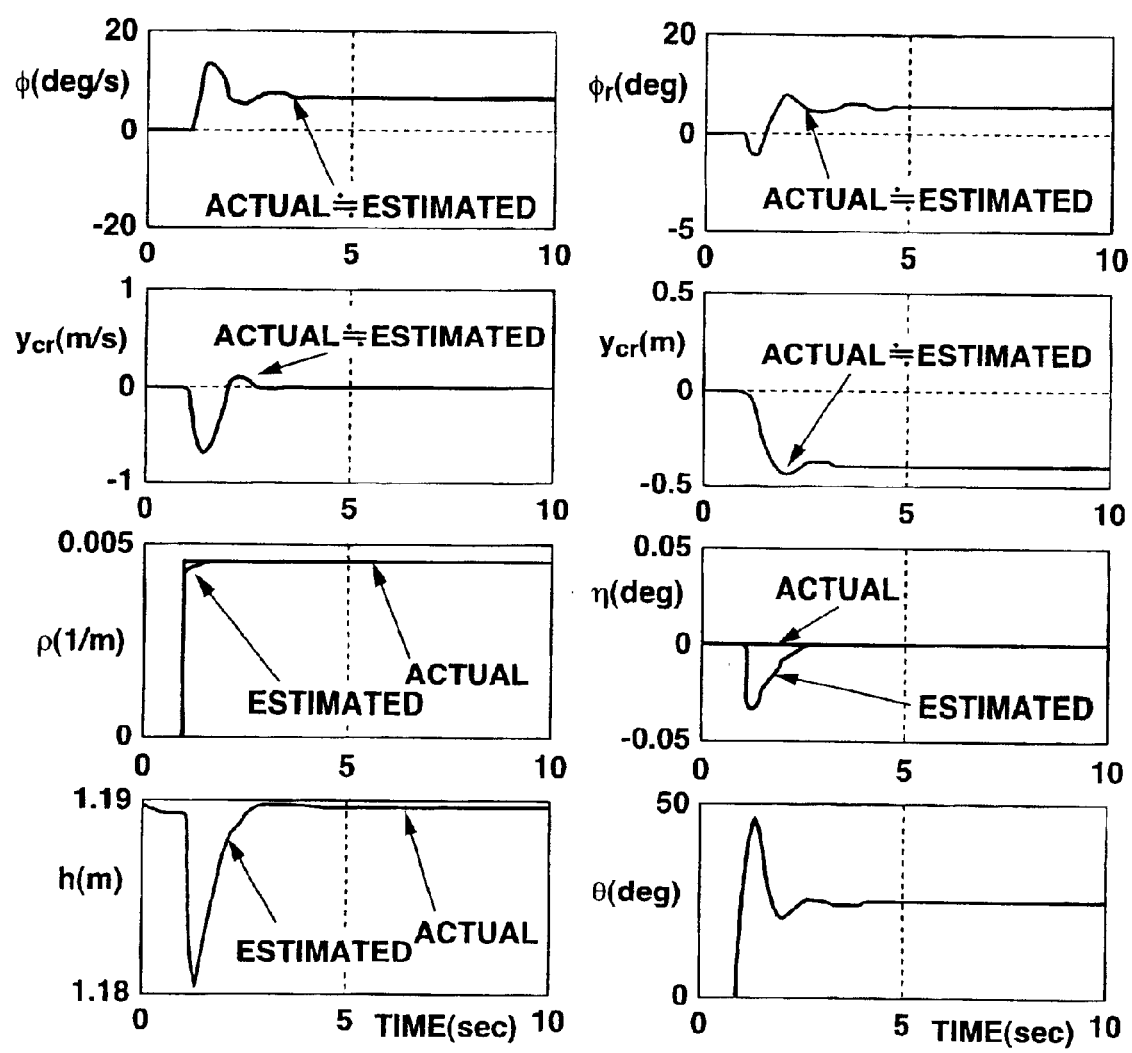
FIG. 19 are graphs showing the simulation result of the second embodiment.

FIG. 18 shows examples of lane markers used in a simulation (of a travel around a corner bent to the left). The shapes and positions of lane markers projected on a screen change with the vehicle depending on the curvature and a state quantity of the vehicle. By way of example, FIG. 19 shows comparison between values estimated with a Kalman filter and true state quantities during the simulation when the vehicle enters a curved section having no transition curve on an automatic steering basis. FIG. 19 shows that an actual state and an estimated value preferably match even when a steering angle is quickly inputted.

This application is based on a prior Japanese Patent Application No. 2000-302709. The entire contents of a Japanese Patent Application No. 2000-302709 with a filing date of Oct. 2, 2000 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A lane recognition apparatus for a vehicle, comprising:

an image picking-up section picking up a road image in front of the vehicle;

a lane-marker candidate-point detecting section detecting coordinate values of a plurality of lane marker candidate points from the road image;

a steering angle detecting section detecting a steering angle of the vehicle, wherein a state equation of an extended Kalman filter uses a change of the vehicle state quantity caused by the steering angle and a vehicle speed; and a road model parameter calculating section estimating a road model parameter representative of a road shape in front of the vehicle and a vehicle state quantity of the vehicle using the extended Kalman filter, on the basis of the coordinate values of the lane marker candidate points, the road model parameter calculating section identifying whether a yaw angle or lateral displacement of the vehicle state quantity is caused by the steering angle, wherein a state equation of the extended Kalman filter uses a change of the vehicle state quantity caused by the steering angle.

2. The lane recognition apparatus as claimed in claim 1, wherein the road model parameter calculating section estimates the state quantity of disturbance so as to maintain preferable properties of following up a quick behavior of the vehicle at the input of the steering angle.

3. The lane recognition apparatus as claimed in claim 1, wherein the road model parameter estimates the state quantity of disturbance so as to prevent the steering angle from generating an error.

4. A lane recognition apparatus for a vehicle, comprising:

a camera picking up a road image in front of the vehicle;

a steering angle sensor for detecting a steering angle of the vehicle; and a processor coupled to the camera and the steering angle sensor, the processor being configured to, calculate coordinate values of a plurality of lane marker candidate points from the road image, identify whether a yaw angle or lateral displacement of the vehicle state quantity is caused by the steering angle from the detecting steering angle, and estimate a road model parameter representative of a road shape in front of the vehicle and a vehicle state quantity from an extended Kalman filter and the coordinate values of the lane marker candidate points, wherein a state equation of the extended Kalman filter uses a change of the vehicle state quantity caused by the steering angle when the yaw angle or lateral displacement of the vehicle state quantity is caused by the steering angle from the detecting steering angle.

* * * * *